United States Patent
Raghavan et al.

(10) Patent No.: US 6,705,967 B2
(45) Date of Patent: Mar. 16, 2004

(54) SIX-SPEED TRANSMISSION WITH THREE PLANETARY GEAR SETS AND FIVE TORQUE TRANSMITTING MECHANISMS

(75) Inventors: Madhusudan Raghavan, West Bloomfield, MI (US); Chi-Kuan Kao, Troy, MI (US); Patrick Benedict Usoro, Troy, MI (US); Raymond James Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/788,709

(22) Filed: Feb. 21, 2001

(65) Prior Publication Data

US 2002/0115522 A1 Aug. 22, 2002

(51) Int. Cl.$^7$ .................................................. F16H 3/66
(52) U.S. Cl. ........................................ 475/275; 475/276
(58) Field of Search ................................ 475/275, 276, 475/280, 288, 290, 296

(56) References Cited

U.S. PATENT DOCUMENTS

| | | | | |
|---|---|---|---|---|
| 4,070,927 A | | 1/1978 | Polak ........................... | 74/765 |
| 5,106,352 A | | 4/1992 | Lepelletier .................. | 475/280 |
| 5,226,862 A | * | 7/1993 | Hattori ........................ | 475/286 |
| 5,460,579 A | * | 10/1995 | Kappel et al. ............... | 475/276 |
| 5,599,251 A | * | 2/1997 | Beim et al. .................. | 475/275 |
| 5,755,636 A | * | 5/1998 | Justice et al. ............... | 475/275 |
| 5,772,552 A | * | 6/1998 | Ibaraki et al. ............... | 475/281 |
| 6,071,208 A | | 6/2000 | Koivunen .................... | 475/275 |
| 6,083,135 A | | 7/2000 | Baldwin et al. ............. | 475/276 |

FOREIGN PATENT DOCUMENTS

JP        1-316552 A    * 12/1989

\* cited by examiner

*Primary Examiner*—Ankur Parekh
(74) *Attorney, Agent, or Firm*—Kathryn A. Marra

(57) ABSTRACT

A transmission family has a plurality of members that each provide six forward speed ratios, a reverse speed ratio and a neutral condition. Each family member has three planetary gear sets that are serially arranged and interconnected to form a planetary gear arrangement and five torque transmitting mechanisms. The planetary gear sets may each be of the single pinion type or double pinion type. In either event each planetary gear set has three rotatable members, namely a sun gear member, a ring gear member, and a planet carrier assembly member. One member of each of the three planetary gear sets are continuously interconnected, in other words three members are interconnected. Another member in each of two planetary gear sets are also continuously interconnect. At least one member of one of the planetary gear sets is continuously connected with an input shaft and at least one member of another of the planetary gear sets is continuously connected with an output shaft.

3 Claims, 16 Drawing Sheets

| | RATIOS | 54 | 56 | 58 | 50 | 52 |
|---|---|---|---|---|---|---|
| REVERSE | -3.77 | X | | X | | |
| NEUTRAL | 0 | | | X | | |
| 1st | 3.97 | | | X | | X |
| 2nd | 2.18 | | X | | | X |
| 3rd | 1.48 | X | | | | X |
| 4th | 1 | | | | X | X |
| 5th | 0.72 | X | | | X | |
| 6th | 0.6 | | X | | X | |

(X=ENGAGED CLUTCH)

RING/SUN TOOTH RATIOS: $\frac{R1}{S1}=1.50$, $\frac{R2}{S2}=2.63$, $\frac{R3}{S3}=1.51$

| Ratio Spread | 6.6 |
|---|---|
| Ratio Steps | |
| Rev/ 1 | -0.95 |
| 1/2 | 1.82 |
| 2/3 | 1.47 |
| 3/4 | 1.48 |
| 4/5 | 1.4 |
| 5/6 | 1.19 |

| | RATIOS | 1656 | 1658 | 1650 | 1652 | 1654 |
|---|---|---|---|---|---|---|
| REVERSE | -2.12 | X | | | | X |
| NEUTRAL | 0 | X | | | | |
| 1st | 3.99 | X | | X | | |
| 2nd | 2.47 | X | X | | | |
| 3rd | 1.67 | X | | | X | |
| 4th | 1.21 | | X | | X | |
| 5th | 1 | | | | X | X |
| 6th | 0.76 | | X | | | X |

(X=ENGAGED CLUTCH)

RING/SUN TOOTH RATIOS: $\frac{R3}{S3}=2.99$, $\frac{R2}{S2}=1.88$, $\frac{R1}{S1}=1.63$

| Ratio Spread | 5.23 |
|---|---|
| Ratio Steps | |
| Rev/ 1 | -0.53 |
| 1/2 | 1.61 |
| 2/3 | 1.48 |
| 3/4 | 1.37 |
| 4/5 | 1.21 |
| 5/6 | 1.31 |

| | RATIOS | 254 | 256 | 258 | 250 | 252 |
|---|---|---|---|---|---|---|
| REVERSE | -3.9 | X | | X | | |
| NEUTRAL | 0 | X | | | | |
| 1st | 4.54 | X | | | | X |
| 2nd | 2.42 | | X | | | X |
| 3rd | 1.56 | | | X | | X |
| 4th | 1 | | | | X | X |
| 5th | 0.71 | | | X | X | |
| 6th | 0.6 | | X | | X | |

(X=ENGAGED CLUTCH)

RING/SUN TOOTH RATIOS: $\frac{R3}{S3}=1.50$, $\frac{R2}{S2}=2.52$, $\frac{R1}{S1}=1.60$

| Ratio Spread | 7.57 |
|---|---|
| Ratio Steps | |
| Rev/ 1 | -0.86 |
| 1/2 | 1.88 |
| 2/3 | 1.55 |
| 3/4 | 1.56 |
| 4/5 | 1.41 |
| 5/6 | 1.18 |

| | RATIOS | 354 | 356 | 358 | 350 | 352 |
|---|---|---|---|---|---|---|
| REVERSE | -3.89 | X | | X | | |
| NEUTRAL | 0 | | | X | | |
| 1st | 4.45 | | | X | X | |
| 2nd | 2.38 | | X | | X | |
| 3rd | 1.55 | X | | | X | |
| 4th | 1 | | | | X | X |
| 5th | 0.71 | X | | | | X |
| 6th | 0.6 | | X | | | X |

(X=ENGAGED CLUTCH)

RING/SUN TOOTH RATIOS: $\frac{R2}{S2}=2.50$, $\frac{R1}{S1}=2.95$, $\frac{R3}{S3}=1.51$

| Ratio Spread | 7.4 |
|---|---|
| Ratio Steps | |
| Rev/ 1 | -0.87 |
| 1/2 | 1.87 |
| 2/3 | 1.53 |
| 3/4 | 1.55 |
| 4/5 | 1.41 |
| 5/6 | 1.18 |

| | RATIOS | 454 | 456 | 458 | 450 | 452 |
|---|---|---|---|---|---|---|
| REVERSE | -3.5 | | X | X | | |
| NEUTRAL | 0 | | | X | | |
| 1st | 3.51 | | | X | X | |
| 2nd | 2 | X | | | X | |
| 3rd | 1.4 | | X | | X | |
| 4th | 1 | | | | X | X |
| 5th | 0.73 | | X | | | X |
| 6th | 0.6 | X | | | | X |

(X = ENGAGED CLUTCH)

RING/SUN TOOTH RATIOS: $\frac{R1}{S1} = 2.33$, $\frac{R2}{S2} = 2.52$, $\frac{R3}{S3} = 1.51$

| Ratio Spread | 5.85 |
|---|---|
| Ratio Steps | |
| Rev/ 1 | -1 |
| 1/2 | 1.75 |
| 2/3 | 1.43 |
| 3/4 | 1.4 |
| 4/5 | 1.38 |
| 5/6 | 1.21 |

| | RATIOS | 554 | 556 | 558 | 550 | 552 |
|---|---|---|---|---|---|---|
| REVERSE | -4.24 | X | | X | | |
| NEUTRAL | 0 | | | X | | |
| 1st | 4.26 | | | X | X | |
| 2nd | 2.26 | | X | | X | |
| 3rd | 1.54 | X | | | X | |
| 4th | 1 | | | | X | X |
| 5th | 0.72 | X | | | | X |
| 6th | 0.61 | | X | | | X |

(X=ENGAGED CLUTCH)

RING/SUN TOOTH RATIOS: $\frac{R2}{S2}=2.20$, $\frac{R1}{S1}=1.68$, $\frac{R3}{S3}=1.58$

| Ratio Spread | 6.94 |
|---|---|
| Ratio Steps | |
| Rev/ 1 | -1 |
| 1/2 | 1.88 |
| 2/3 | 1.47 |
| 3/4 | 1.54 |
| 4/5 | 1.4 |
| 5/6 | 1.17 |

| | RATIOS | 654 | 656 | 658 | 650 | 652 |
|---|---|---|---|---|---|---|
| REVERSE | -1.8 | | X | | X | |
| NEUTRAL | 0 | | X | | | |
| 1st | 2.53 | | X | | | X |
| 2nd | 1.55 | | | X | | X |
| 3rd | 1 | | | | X | X |
| 4th | 0.75 | X | | | | X |
| 5th | 0.54 | X | | | X | |
| 6th | 0.42 | X | | X | | |

(X = ENGAGED CLUTCH)

RING/SUN TOOTH RATIOS: $\frac{R2}{S2} = 1.86$, $\frac{R1}{S1} = 1.53$, $\frac{R3}{S3} = 1.80$

| Ratio Spread | 6.06 |
|---|---|
| Ratio Steps | |
| Rev/ 1 | -0.71 |
| 1/2 | 1.64 |
| 2/3 | 1.55 |
| 3/4 | 1.33 |
| 4/5 | 1.39 |
| 5/6 | 1.3 |

| | RATIOS | 754 | 756 | 758 | 750 | 752 |
|---|---|---|---|---|---|---|
| REVERSE | -1.5 | | X | | X | |
| NEUTRAL | 0 | | X | | | |
| 1st | 2.51 | | X | | | X |
| 2nd | 1.61 | X | | | | X |
| 3rd | 1 | | | | X | X |
| 4th | 0.75 | | | X | | X |
| 5th | 0.53 | | | X | X | |
| 6th | 0.39 | X | | X | | |

(X=ENGAGED CLUTCH)

RING/SUN TOOTH RATIOS: $\frac{R3}{S3} = 1.50$, $\frac{R2}{S2} = 1.68$, $\frac{R1}{S1} = 1.85$

| Ratio Spread | 6.45 |
|---|---|
| Ratio Steps | |
| Rev/ 1 | -0.60 |
| 1/2 | 1.57 |
| 2/3 | 1.61 |
| 3/4 | 1.33 |
| 4/5 | 1.43 |
| 5/6 | 1.35 |

| | RATIOS | 854 | 856 | 858 | 850 | 852 |
|---|---|---|---|---|---|---|
| REVERSE | -1.6 | X | | | X | |
| NEUTRAL | 0 | X | | | | |
| 1st | 2.4 | X | | | | X |
| 2nd | 1.54 | | | X | | X |
| 3rd | 1 | | | | X | X |
| 4th | 0.76 | | X | | | X |
| 5th | 0.53 | | X | | X | |
| 6th | 0.4 | | X | X | | |

(X=ENGAGED CLUTCH)

RING/SUN TOOTH RATIOS: $\frac{R2}{S2}=1.50$, $\frac{R1}{S1}=1.83$, $\frac{R3}{S3}=1.60$

| Ratio Spread | 6.03 |
|---|---|
| Ratio Steps | |
| Rev/ 1 | -0.67 |
| 1/2 | 1.56 |
| 2/3 | 1.54 |
| 3/4 | 1.32 |
| 4/5 | 1.43 |
| 5/6 | 1.33 |

| | RATIOS | 954 | 956 | 958 | 950 | 952 |
|---|---|---|---|---|---|---|
| REVERSE | -2.2 | | X | | X | |
| NEUTRAL | 0 | | X | | | |
| 1st | 2.51 | | X | | | X |
| 2nd | 1.47 | | | X | | X |
| 3rd | 1 | | | | X | X |
| 4th | 0.72 | X | | | | X |
| 5th | 0.51 | X | | | X | |
| 6th | 0.42 | X | | X | | |

(X=ENGAGED CLUTCH)

RING/SUN TOOTH RATIOS: $\frac{R1}{S1}=1.54$, $\frac{R2}{S2}=2.90$, $\frac{R3}{S3}=2.20$

| Ratio Spread | 6.04 |
|---|---|
| Ratio Steps | |
| Rev/ 1 | -0.88 |
| 1/2 | 1.71 |
| 2/3 | 1.47 |
| 3/4 | 1.39 |
| 4/5 | 1.4 |
| 5/6 | 1.23 |

| | RATIOS | 1054 | 1056 | 1058 | 1050 | 1052 |
|---|---|---|---|---|---|---|
| REVERSE | -2.5 | | X | | X | |
| NEUTRAL | 0 | | X | | | |
| 1st | 2.83 | | X | | | X |
| 2nd | 1.52 | X | | | | X |
| 3rd | 1 | | | | X | X |
| 4th | 0.74 | | | X | | X |
| 5th | 0.57 | | | X | X | |
| 6th | 0.46 | X | | X | | |

(X=ENGAGED CLUTCH)

RING/SUN TOOTH RATIOS: $\frac{R3}{S3} = 2.50$, $\frac{R2}{S2} = 1.83$, $\frac{R1}{S1} = 1.85$

| Ratio Spread | 6.11 |
|---|---|
| Ratio Steps | |
| Rev/ 1 | -0.88 |
| 1/2 | 1.86 |
| 2/3 | 1.52 |
| 3/4 | 1.35 |
| 4/5 | 1.3 |
| 5/6 | 1.23 |

| | RATIOS | 1156 | 1158 | 1150 | 1152 | 1154 |
|---|---|---|---|---|---|---|
| REVERSE | -2.57 | X | | | X | |
| NEUTRAL | 0 | X | | | | |
| 1st | 4.85 | X | | | | X |
| 2nd | 2.93 | X | X | | | |
| 3rd | 1.92 | X | | X | | |
| 4th | 1.26 | | X | X | | |
| 5th | 1 | | | X | X | |
| 6th | 0.76 | | X | | X | |

(X=ENGAGED CLUTCH)

RING/SUN TOOTH RATIOS: $\frac{R2}{S2}=1.89$, $\frac{R3}{S3}$ 2.08, $\frac{R1}{S1}=1.53$

| Ratio Spread | 6.38 |
|---|---|
| Ratio Steps | |
| Rev/ 1 | -0.53 |
| 1/2 | 1.65 |
| 2/3 | 1.53 |
| 3/4 | 1.53 |
| 4/5 | 1.26 |
| 5/6 | 1.31 |

| | RATIOS | 1256 | 1258 | 1250 | 1252 | 1254 |
|---|---|---|---|---|---|---|
| REVERSE | -2.44 | X | | | | X |
| NEUTRAL | 0 | X | | | | |
| 1st | 3.15 | X | X | | | |
| 2nd | 2.05 | X | | | X | |
| 3rd | 1.31 | | X | | X | |
| 4th | 1 | | | | X | X |
| 5th | 0.74 | | X | | | X |
| 6th | 0.55 | | X | X | | |

(X=ENGAGED CLUTCH)

RING/SUN TOOTH RATIOS: $\frac{R3}{S3}=2.37$, $\frac{R2}{S2}=2.34$, $\frac{R1}{S1}=1.81$

| Ratio Spread | 5.71 |
|---|---|
| Ratio Steps | |
| Rev/ 1 | -0.77 |
| 1/2 | 1.53 |
| 2/3 | 1.57 |
| 3/4 | 1.31 |
| 4/5 | 1.34 |
| 5/6 | 1.35 |

| | RATIOS | 1356 | 1358 | 1350 | 1352 | 1354 |
|---|---|---|---|---|---|---|
| REVERSE | -4.89 | | X | | X | |
| NEUTRAL | 0 | | X | | | |
| 1st | 5.6 | X | X | | | |
| 2nd | 3.36 | X | | | X | |
| 3rd | 2.16 | X | | | | X |
| 4th | 1.4 | X | | X | | |
| 5th | 1 | | | X | X | |
| 6th | 0.75 | | X | X | | |

(X=ENGAGED CLUTCH)

RING/SUN TOOTH RATIOS: $\frac{R2}{S2}=1.86$, $\frac{R3}{S3}=1.88$, $\frac{R1}{S1}=1.60$

| Ratio Spread | 7.43 |
|---|---|
| Ratio Steps | |
| Rev/ 1 | -0.87 |
| 1/2 | 1.67 |
| 2/3 | 1.56 |
| 3/4 | 1,54 |
| 4/5 | 1.4 |
| 5/6 | 1.33 |

| | RATIOS | 1454 | 1456 | 1458 | 1450 | 1452 |
|---|---|---|---|---|---|---|
| REVERSE | -1.59 | X | | | | X |
| NEUTRAL | 0 | X | | | | |
| 1st | 2.54 | X | | | X | |
| 2nd | 1.59 | | X | | X | |
| 3rd | 1 | | | | X | X |
| 4th | 0.75 | | | X | X | |
| 5th | 0.53 | | | X | | X |
| 6th | 0.4 | | X | X | | |

(X=ENGAGED CLUTCH)

RING/SUN TOOTH RATIOS: $\frac{R3}{S3}=1.54$, $\frac{R2}{S2}=1.60$, $\frac{R1}{S1}=1.85$

| Ratio Spread | 6.37 |
|---|---|
| Ratio Steps | |
| Rev/ 1 | -0.63 |
| 1/2 | 1.59 |
| 2/3 | 1.59 |
| 3/4 | 1.33 |
| 4/5 | 1.42 |
| 5/6 | 1.33 |

| | RATIOS | 1556 | 1558 | 1550 | 1552 | 1554 |
|---|---|---|---|---|---|---|
| REVERSE | -4.83 | | X | | X | |
| NEUTRAL | 0 | | X | | | |
| 1st | 4.87 | X | X | | | |
| 2nd | 2.78 | X | | | X | |
| 3rd | 1.87 | X | | | | X |
| 4th | 1.31 | X | | X | | |
| 5th | 1 | | | X | | X |
| 6th | 0.75 | | X | X | | |

(X=ENGAGED CLUTCH)

RING/SUN TOOTH RATIOS: $\frac{R3}{S3}=1.86$, $\frac{R2}{S2}=2.30$, $\frac{R1}{S1}=1.60$

| Ratio Spread | 6.48 |
|---|---|
| Ratio Steps | |
| Rev/ 1 | -0.99 |
| 1/2 | 1.75 |
| 2/3 | 1.48 |
| 3/4 | 1.43 |
| 4/5 | 1.31 |
| 5/6 | 1.33 |

SIX-SPEED TRANSMISSION WITH THREE PLANETARY GEAR SETS AND FIVE TORQUE TRANSMITTING MECHANISMS

TECHNICAL FIELD

This invention relates to multi-speed planetary transmissions for use in vehicles and, more particularly, to multi-speed planetary transmissions having six or more forward speed ratios.

BACKGROUND OF THE INVENTION

Passenger vehicles include a powertrain that is comprised of an engine, multi-speed transmission and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration. It has been suggested that the number of forward speed ratios be increased to five and even six speeds. This has been accomplished in many heavy truck powertrains. Six-speed transmissions are disclosed in U.S. Pat. No. 4,070,927 issued to Polak on Jan. 31, 1978, and U.S. Pat. No. 6,071,208 issued to Koivunen on Jun. 6, 2000.

The Polak transmission provides six forward speed ratios. Six-speed transmissions offer several advantages over four-speed transmissions, including improved vehicle acceleration and improved fuel economy. While many trucks employ power transmissions, such as Polak, having six or more forward gear ratios, passenger cars are still manufactured with three- and four-speed automatic transmissions and relatively few five or six-speed devices due to the size and complexity of these transmissions. The Koivunen patent utilizes six torque transmitting devices including four brakes and two clutches to establish the six forward speed ratios and one reverse ratio.

SUMMARY OF THE INVENTION

It is an object of the present invention to provide an improved planetary transmission having three planetary gear sets to establish at least six forward speed ratios.

In one aspect of the present invention, the planetary transmission has three interconnected planetary gear sets. In another aspect of the present invention, the planetary gear sets are selectively controlled by five torque transmitting mechanisms to produce at least six forward speed ratios and one reverse ratio. In yet another aspect of the present invention, the torque transmitting mechanisms include at least two clutches and two brakes.

In still another aspect of the present invention, the torque transmitting mechanisms include three clutches and two brakes. In yet still another aspect of the present invention, the torque transmitting mechanisms include two clutches and three brakes. In still yet another aspect of the present invention, the three planetary gear sets are continuously interconnected through one member of each planetary gear set to provide three interconnected members. In still yet another aspect of the present invention, two adjacent planetary gear sets are continuously interconnected through another member of each planetary gear set to provide two interconnected members. In a further aspect of the present invention, at least one planetary gear set has a member continuously connected with an input shaft. In a further aspect of the present invention, at least one planetary gear set has a member continuously connected with an output shaft.

In yet a further aspect of the present invention, one of the torque transmitting mechanisms selectively connects a member of one of the planetary gear sets with the input shaft, and another of the torque transmitting mechanisms selectively interconnects one member in each of two of the planetary gear sets. In a still further aspect of the present invention, a further of the torque transmitting mechanisms is selectively operable to connect the three continuously interconnected planetary gear members with a stationary housing. In yet still a further aspect of the present invention, each of the planetary gear sets is a simple planetary gear set wherein only a single pinion mesh is present between the sun gear member and the ring gear member. In yet still another aspect of the present invention, at least one of the planetary gear sets has intermeshing pinion gear members that mesh with the sun gear member and the ring gear member, respectively.

The present invention is embodied in a family of transmissions that provide low mechanical content and low cost in a six-speed planetary transmission mechanism. Each family member has three planetary gear sets that are serially arranged and interconnected to form a planetary gear arrangement. The planetary gear sets may each be of the single pinion type or double pinion type. In either event, each planetary gear set has three rotatable members, namely a sun gear member, a ring gear member, and a planet carrier assembly member. One member of each of the three planetary gear sets are continuously interconnected; in other words, three members are interconnected. Another member in each of two adjacent planetary gear sets are also continuously interconnected; in other words, two members are interconnected. At least one member of one of the planetary gear sets is continuously connected with an input shaft and at least one member of another of the planetary gear sets is continuously connected with an output shaft. The transmissions include five torque transmitting mechanisms that are selectively operable in combinations of two to establish six forward speeds and a reverse speed.

A first of the torque transmitting mechanisms selectively connects a member of a first or second of the planetary gear sets to a stationary transmission member, such as a housing, and a second of the torque transmitting mechanisms selectively connects the second or a third of the planetary gear sets with the stationary transmission member. A third and a fourth of the torque transmitting mechanisms each selectively interconnects a member of the third planetary gear set with a member of the first or second planetary gear set. A fifth of the torque transmitting mechanisms selectively connects a member of one of the planetary gear sets to the stationary member or, in the alternative, the fifth of the torque transmitting mechanisms connects a member of one of the planetary gear sets with one member of one or more of the planetary gear sets.

DESCRIPTION OF THE EXEMPLARY EMBODIMENTS

Figures 1, 2:
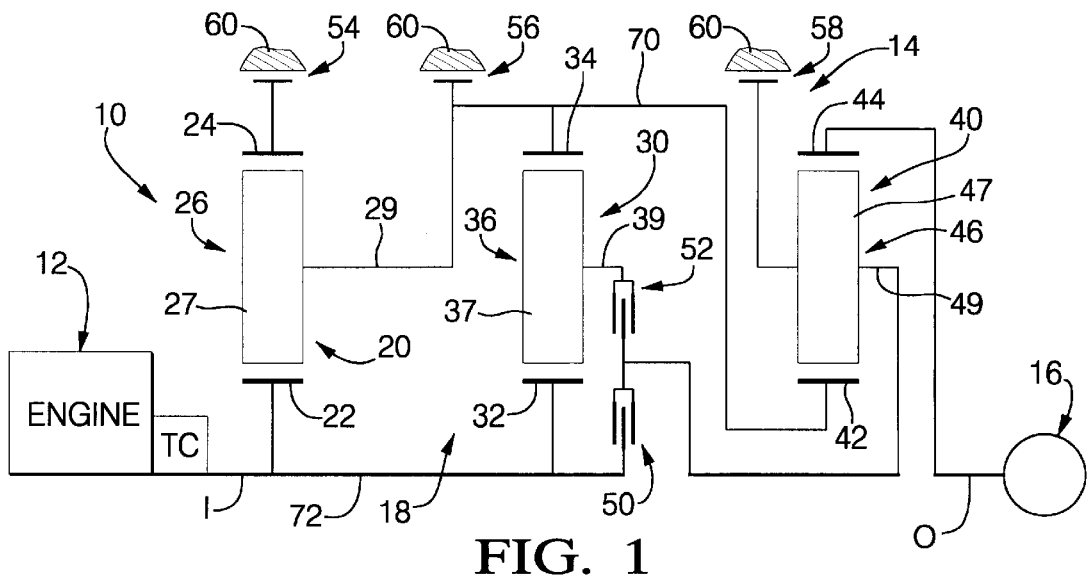
FIG. 1 is a schematic diagram of a powertrain having a transmission incorporating an embodiment of the present invention.
FIG. 2 is a truth table of the shift sequence of the transmission of FIG. 1 and the ratio steps between adjacent drive ratios.

A powertrain 10, shown in FIG. 1, has a conventional engine and torque converter 12, a planetary transmission 14, and a conventional final drive 16. The engine and torque converter 12 are drivingly connected with the transmission 14 through an input shaft I. The transmission is drivingly connected with the final drive 16 through an output shaft O. The planetary transmission 14 includes a planetary gear arrangement 18 that includes a first planetary gear set 20, a second planetary gear set 30 and a third planetary gear set 40. The planetary transmission also includes five torque transmitting mechanism 50, 52, 54, 56 and 58 which are conventional selectively engageable fluid-operated devices. The torque transmitting mechanisms 50 and 52 are rotating type mechanisms which are commonly termed clutches. The torque transmitting mechanisms 54, 56 and 58 are stationary type mechanisms which are commonly termed brakes. The torque transmitting mechanisms 54, 56 and 58 are connected to a stationary component of the transmission 14 such as a housing 60. The torque transmitting mechanisms are preferably fluid-operated devices, the engagement and disengagement of which is controlled by a conventional electro-hydraulic control mechanism, not shown, which includes a programmable digital computer. Such control mechanisms are well known to those skilled in the art.

The planetary gear set 20 includes a sun gear member 22, a ring gear member 24, and a planet carrier assembly member 26 comprised of a plurality of planet pinion gears 27 that are rotatably mounted on a planet carrier 29. The planet pinion gears 27 each mesh with the sun gear member 22 and the ring gear member 24. The planetary gear set 30 includes a sun gear member 32, a ring gear member 34, and a planet carrier assembly member 36 comprised of a plurality of planet pinion gear members 37 that are rotatably mounted on a planet carrier 39. The planet pinion gears each mesh with the sun gear member 32 and the ring gear member 34. The planetary gear set 40 includes a sun gear member 42, a ring gear member 44, and a planet carrier assembly member 46 comprised of a plurality of planet pinion gears 47 that are rotatably mounted on a planet carrier 49 and disposed in meshing relation with both the sun gear member 42 and the ring gear member 44.

The planet carrier assembly member 26, the ring gear member 34, and the sun gear member 42 are continuously interconnected by a first continuous or fixed interconnection 70. The sun gear members 22 and 32 are continuously interconnected by a second continuous or fixed interconnection 72 and are also continuously connected with the input shaft I. The second continuous interconnection 72 and the planet carrier assembly member 46 are selectively interconnectable by the engagement of torque transmitting mechanism 50. With the engagement of the torque transmitting mechanism 50, the planet carrier assembly member 46 will rotate in unison with the input shaft I and therefore the engine and torque converter 12. The planet carrier assembly member 36 and the planet carrier assembly member 46 are selectively interconnectable by the engagement of the torque transmitting mechanism 52. The ring gear member 24 is selectively connectable with the housing 60 by the engagement of the torque transmitting mechanism 54. The first continuous interconnection 70 is selectively connectable with the housing 60 by the engagement of the torque transmitting mechanism 56. The planet carrier assembly member 46 is selectively connectable with the housing 60 by the engagement of the torque transmitting mechanism 58. The engagement of both the torque transmitting mechanism 52 and the torque transmitting mechanism 58 will connect both the planet carrier assembly member 36 and the planet carrier assembly member 46 to the housing 60. The ring gear member 44 is continuously connected with the output shaft O.

The selective engagement of the torque transmitting mechanisms 50, 52, 54, 56 and 58 in combinations of two, as shown in the truth table of FIG. 2, will provide six forward speed ratios and a reverse ratio. The reverse ratio is established by the engagement of the torque transmitting mechanisms 54 and 58. This establishes the ring gear member 24 and the planet carrier assembly member 46 as reaction members. The sun gear member 22 is an input member during the reverse ratio. The numerical value of the reverse ratio is determined by the ring gear to sun gear ratio (ring/sun ratio) of the planetary gear sets 20 and 40. The planet carrier assembly member 26 and the sun gear member 42 are driven forwardly at a reduced ratio and the ring gear member 44 is driven in reverse at a reduced ratio.

The first forward speed ratio is established by the engagement of the torque transmitting mechanisms 52 and 58. This establishes the planet carrier assembly member 46 and the planet carrier assembly member 36 as reaction members. The sun gear member 32 is the input member. The numerical value of the first forward ratio is determined by the ring gear to sun gear ratio of both the planetary gear sets 30 and 40.

The ring gear member 34 and the sun gear member 42 are driven in reverse at a reduced speed and the ring gear member 44 is driven forward at a reduced speed resulting in a forward reduced speed at the output shaft O.

The second forward speed ratio is established by the engagement of the torque transmitting mechanisms 52 and 56 and the disengagement of the torque transmitting mechanism 58. This is a single transition ratio interchange. The ring gear member 34 and the sun gear member 42 are reaction members and the sun gear member 32 is an input member. The planet carrier assembly member 36 is driven forwardly at a reduced ratio. The planetary gear set 40 is in an overdrive condition, however, the input speed to the planet carrier assembly member 46 is reduced such that the overall ratio from the input shaft I to the output shaft O is a reduced ratio. The numerical value of the second forward speed ratio is determined by the ring/sun ratios of the planetary gear sets 30 and 40.

A second to third speed interchange is accomplished by the interchange of the torque transmitting mechanisms 56 and 54 while the torque transmitting mechanism 52 remains engaged. This is a single transition interchange. This establishes the ring gear member 24 as a reaction member and the sun gear member 22 as an input member. The sun gear member 42 is driven forwardly at a reduced ratio determined by the planetary gear set 20 and the planet carrier assembly member 46 is also driven forwardly at a reduced ratio. The ring gear member 44 and therefore the output shaft O are driven forwardly at a reduced ratio. The numerical value of the third forward ratio is determined by ring/sun ratios of all three planetary gear sets 20, 30, and 40.

A third to fourth speed ratio interchange is accomplished by the interchange of the torque transmitting mechanisms 54 and 50 while the torque transmitting mechanism 52 remains engaged. This is a single transition ratio interchange. With the torque transmitting mechanisms 52 and 50 engaged, the planetary gear sets 20, 30 and 40 are in a direct drive ratio such that the overall ratio from the input shaft I to the output shaft O is a one to one ratio.

The fourth to fifth speed ratio interchange is accomplished by the interchange of the torque transmitting mechanisms 52 and 54 while the torque transmitting mechanism 50 remains engaged. This is a single transition ratio interchange. The ring gear member 24 is a reaction member and the sun gear members 22 and 32 are input members. The first continuous interconnection 70 is driven forwardly at a reduced ratio determined by the ring/sun ratio of the planetary gear set 20. The planet carrier assembly member 46 is driven forwardly at input speed. The ring gear member 44 and the output shaft O are driven forwardly at an overdrive ratio determined by the ring/sun ratios of the planetary gear set 40 and the planetary gear set 20. The speed of the planet carrier assembly member 46 is faster, for a given engine speed, than the speed of the sun gear member 42.

The fifth to sixth speed interchange is accomplished by the interchange of the torque transmitting mechanisms 54 and 56 while the torque transmitting mechanism 50 remains engaged. This establishes the first continuous interconnection and therefore the planet carrier assembly member 26, the ring gear member 34 and the sun gear member 42 as stationary members in the planetary gear arrangement 18. The sun gear member 22 is an engine driven input member. The planet carrier assembly member 46 is driven forwardly at the same speed as the input. This results in the ring gear member 44 and the output shaft O being driven forwardly at an overdrive ratio determined by the ring/sun ratio of the planetary gear set 40.

The truth table and chart of FIG. 2 describe the engagement sequence of the torque transmitting mechanisms for the various speed ratios, the actual ratio numbers for the given ring/sun ratios, and the numerical value of the ratio steps between adjacent ratios. In the truth table of FIG. 2, R1 represents the number of teeth on the ring gear member 24, S1 represents the number of teeth on the sun gear member 22, R2 represents the number of teeth on the ring gear member 34, S2 represents the number of teeth on the sun gear member 32, R3 represents the number of teeth on the ring gear member 44, and S3 represents the number of teeth on the sun gear member 42. It should be noted that the torque transmitting mechanism 58 can remain engaged during a reverse to forward gear change as the transmission passes through neutral. Also double step interchanges such as $1^{st}$ to $3^{rd}$, $2^{nd}$ to $4^{th}$, $3^{rd}$ to $5^{th}$, and $4^{th}$ to $6^{th}$ are single transition interchanges.

Figures 5, 6:
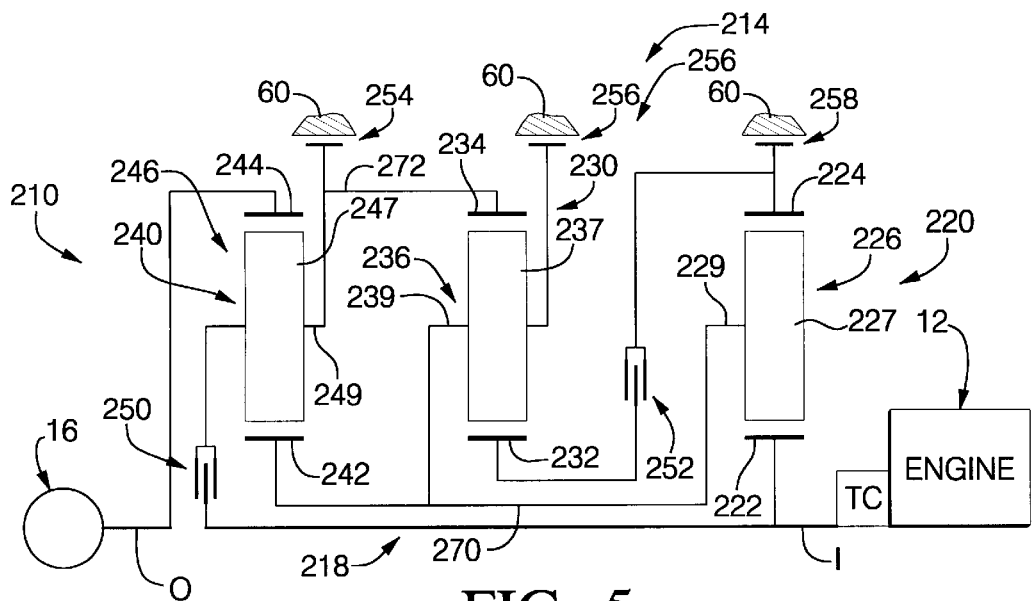
FIG. 5 is a schematic diagram of a powertrain having a transmission incorporating an embodiment of the present invention.
FIG. 6 is a truth table of the shift sequence of the transmission of FIG. 5 and the ratio steps between adjacent drive ratios.

A powertrain 210, shown in FIG. 5, has the conventional engine and torque converter 12, a planetary transmission 214, and the conventional final drive 16. The engine and torque converter 12 are drivingly connected with the transmission 214 through an input shaft I. The transmission is drivingly connected with the final drive 16 through an output shaft O. The planetary transmission 214 includes a planetary gear arrangement 218 that includes a first planetary gear set 220, a second planetary gear set 230 and a third planetary gear set 240. The planetary transmission also includes five torque transmitting mechanism 250, 252, 254, 256, and 258 which are conventional selectively engageable fluid operated devices. The torque transmitting mechanisms 250 and 252 are rotating type mechanisms which are commonly termed clutches. The torque transmitting mechanisms 254, 256 and 258 are stationary type mechanisms which are commonly termed brakes. The torque transmitting mechanisms 254, 256, and 258 are connected to a stationary component of the transmission 214 such as the housing 60.

The planetary gear set 220 includes a sun gear member 222, a ring gear member 224, and a planet carrier assembly member 226 that has a plurality of planet pinion gear members 227 rotatably mounted on a planet carrier 229. The planetary gear set 230 includes a sun gear member 232, a ring gear member 234, and a planet carrier assembly member 236 that has a plurality of planet pinion gears 237 rotatably mounted on a planet carrier 239. The planetary gear set 240 has a sun gear member 242, a ring gear member 244, and a planet carrier assembly member 246 that includes a plurality of planet pinion gears 247 rotatably mounted on a planet carrier 249.

The sun gear member 222 is continuously connected with the input shaft I and the ring gear member 244 is continuously connected with the output shaft O. The ring gear member 224 is selectively connectable with the housing 60 by the torque transmitting mechanism 258 and with the sun gear member 232 by the torque transmitting mechanism 252. The planet carrier assembly member 226, the planet carrier assembly member 236 and the sun gear member 242 are continuously interconnected by a first continuous interconnection 270 which is also selectively connectable with the housing 60 by the torque transmitting mechanism 256. The planet carrier assembly member 246 and the ring gear member 234 are continuously interconnected by a second continuous interconnection 272 which is also selectively connectable with the housing 60 by the torque transmitting mechanism 254. The torque transmitting mechanisms 250, 252, 254, 256, and 258 are selectively engaged in combinations of two to establish six forward speed ratios and a reverse speed ratio. A neutral condition is established by the disengagement of all of the torque transmitting mechanisms or the engagement of only the torque transmitting mechanism 254.

The reverse speed ratio is accomplished by the engagement of the torque transmitting mechanism 254 and 258 to establishes the planet carrier assembly member 246 and the ring gear member 224 as reaction members and the sun gear member 222 is an input member. The planet carrier assembly member 226 and the sun gear member 242 are driven forwardly at a reduced speed and the ring gear member 244 and the output shaft O are driven in reverse at a reduced speed. The numerical value of the reverse speed ratio is determined by the ring/sun tooth ratios of the planetary gear sets 220 and 240.

The first forward speed ratio is accomplished by the engagement of the torque transmitting mechanisms 252 and 254 which establishes the planet carrier assembly member 246 as a reaction member and interconnects the ring gear member 224 and the sun gear member 232. The sun gear member 242, planet carrier assembly member 236 and the planet carrier assembly member 226 are rotating reaction members which result in reverse rotation of the ring gear member 224 and the sun gear member 232. This will force reverse rotation of the first continuous interconnection 270 and forward rotation of the ring gear member 244 and the output shaft O. The numerical value of the first forward speed ratio is determined by the ring/sun tooth ratios of the planetary gear sets 220, 230, and 240. It should be noted that a first/reverse interchange can be attained while the torque transmitting mechanism 254 remains engaged.

A first to second ratio change is accomplished by the interchange of the torque transmitting mechanisms 254 and 256 while the torque transmitting mechanism 252 remains engaged. This will establish the first continuous interconnection 270 as the reaction within the planetary gear arrangement 218 and the planet carrier assembly member 226, the planet carrier assembly member 236, and the sun gear member 242 will be held stationary. The sun gear member 222 is the input member. The ring gear member 224 and the sun gear member 232 are driven in reverse at a speed determined by the ring/sun tooth ratio of the planetary gear set 220. The ring gear member 234 and the planet carrier assembly member 246 are driven forwardly at a reduced speed determined by the ring/sun tooth ratio of the planetary gear set 230 and the speed of the sun gear member 232. The ring gear member 244 and the output shaft O are driven forwardly at a reduced ratio determined by the ring/sun tooth ratio of the planetary gear set 240 and the speed of the planet carrier assembly member 246. The numerical value of the second forward speed ratio is determined by the ring/sun tooth ratios of the planetary gear sets 220, 230, and 240.

A second to third forward speed ratio single transition change is accomplished by the interchange of the torque transmitting mechanisms 256 and 258 while the torque transmitting mechanism 252 remains engaged. This establishes the ring gear member 224 and the sun gear member 232 as reaction members in the planetary gear arrangement 218. The sun gear member 222 is the input member. The planet carrier assembly member 226, the planet carrier assembly member 236 and the sun gear member 242 are driven forwardly at a reduced ratio determined by the ring/sun tooth ratio of the planetary gear set 220. The ring gear member 234 and the planet carrier assembly member 246 are driven forwardly at a speed determined by the speed of the planet carrier assembly member 236 and the ring/sun tooth ratio of the planetary gear set 230. The ring gear member 244 and the output shaft O are driven forwardly at a speed determined by the speed of the sun gear member 242, the speed of the planet carrier assembly member 246 and the ring/sun tooth ratio of the planetary gear set 240. The overall numerical value of the third forward speed ratio is determined by the ring/sun tooth ratios of the planetary gear sets 220, 230, and 240.

A third to fourth forward speed ratio single transition interchange is accomplished by the swapping of the torque transmitting mechanisms 258 and 250. This places the planetary gear arrangement 218 in a one to one or direct drive condition wherein the input and output speed are equal.

A fourth to fifth forward speed ratio interchange is accomplished by swapping the torque transmitting mechanisms 252 and 258 while the torque transmitting mechanism 250 remains engaged in a single transition interchange. This establishes the ring gear member 224 as a reaction member and the sun gear member 222 and the planet carrier assembly member 246 as input members. The planet carrier assembly member 226 and the sun gear member 242 are driven forwardly at a reduced speed determined by the ring/sun tooth ratio of the planetary gear set 220. The ring gear member 244 and the output shaft O are driven forwardly at a speed greater than the input speed as determined by the reduced speed of the sun gear member 242, the input speed of the planet carrier assembly member 246 and the ring/sun tooth ratio of the planetary gear set 240. The overall numerical value of the fifth forward speed ratio is determined by the ring/sun tooth ratios of the planetary gear sets 220 and 240.

A fifth to sixth forward speed ratio interchange is accomplished by the swapping of the torque transmitting mechanisms 258 and 256 while the torque transmitting mechanism 250 remains engaged in a single transition interchange. This establishes the sun gear member 242 as a reaction member and the planet carrier assembly member 246 as the input member. The ring gear member 244 and the output shaft O are driven forwardly at a an increased speed relative to the input shaft I. The numerical value of the sixth forward speed ratio is determined by the ring/sun tooth ratio of the planetary gear set 240.

The truth table and chart of FIG. 6 describe the engagement sequence of the torque transmitting mechanisms for the various speed ratios, the actual ratio numbers for the given ring/sun ratios, and the numerical value of the ratio steps between adjacent ratios. In the truth table of FIG. 6, R1 represents the number of teeth on the ring gear member 224, S1 represents the number of teeth on the sun gear member 222, R2 represents the number of teeth on the ring gear member 234, S2 represents the number of teeth on the sun gear member 232, R3 represents the number of teeth on the ring gear member 244, and S3 represents the number of teeth on the sun gear member 242. It should be noted that the torque transmitting mechanism 254 can remain engaged during a reverse to forward gear change as the transmission passes through neutral. Also, double step interchanges such as $1^{st}$ to $3^{rd}$, $2^{nd}$ to $4^{th}$, $3^{rd}$ to $5^{th}$, and $4^{th}$ to $6^{th}$ are single transition interchanges.

Figures 7, 8:
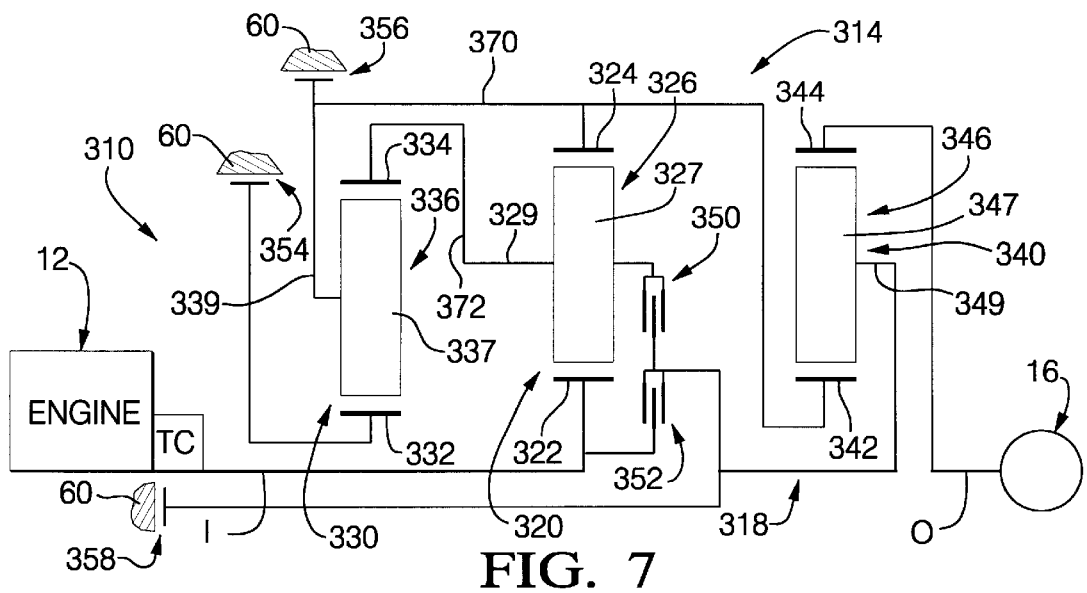
FIG. 7 is a schematic diagram of a powertrain having a transmission incorporating an embodiment of the present invention.
FIG. 8 is a truth table of the shift sequence of the transmission of FIG. 7 and the ratio steps between adjacent drive ratios.

A powertrain 310, shown in FIG. 7, has the conventional engine and torque converter 12, a planetary transmission 314, and the conventional final drive 16. The engine and torque converter 12 are drivingly connected with the transmission 314 through an input shaft I. The transmission is drivingly connected with the final drive 16 through an output shaft O. The planetary transmission 314 includes a planetary gear arrangement 318 that includes a first planetary gear set 320, a second planetary gear set 330 and a third planetary gear set 340. The planetary transmission also includes five torque transmitting mechanism 350, 352, 354, 356, and 358 which are conventional selectively engageable fluid operated devices. The torque transmitting mechanisms 350 and 352 are rotating type mechanisms which are commonly termed clutches. The torque transmitting mechanisms 354, 356 and 358 are stationary type mechanisms which are commonly termed brakes. The torque transmitting mechanisms 354, 356, and 358 are connected to a stationary component of the transmission 314 such as the housing 60.

The planetary gear set 320 includes a sun gear member 322, a ring gear member 324, and a planet carrier assembly member 326 that has a plurality of planet pinion gear members 327 rotatably mounted on a planet carrier 329. The planetary gear set 330 includes a sun gear member 332, a ring gear member 334, and a planet carrier assembly member 336 that has a plurality of planet pinion gears 337 rotatably mounted on a planet carrier 339. The planetary gear set 340 has a sun gear member 342, a ring gear member 344, and a planet carrier assembly member 346 that includes a plurality of planet pinion gears 347 rotatably mounted on a planet carrier 349.

The sun gear member 322 is continuously connected with the input shaft I and the ring gear member 344 is continuously connected with the output shaft O. The ring gear member 324, the planet carrier assembly member 336 and the sun gear member 342 are continuously interconnected by a first continuous interconnection 370. The planet carrier assembly member 326 and the ring gear member 334 are continuously interconnected by a second continuous interconnection 372. The sun gear member 332 is selectively connectable with the housing 60 by the torque transmitting mechanism 354. The first continuous interconnection 370 is selectively connectable with the housing 60 by the torque transmitting mechanism 356. The planet carrier assembly member 346 is selectively connectable with the housing 60 by the torque transmitting mechanism 358, with the input shaft I by the torque transmitting mechanism 352 and with the second continuous interconnection 372 by the torque transmitting mechanism 350. The torque transmitting mechanisms 350, 352, 354, 356, and 358 are selectively engageable in combinations of two to establish six forward speed ratios and a reverse speed ratio between the input shaft I and the output shaft O. A neutral condition is also attainable by the disengagement of all of the torque transmitting mechanisms or by the engagement of only the torque transmitting mechanism 358.

The reverse speed ratio is established with the engagement of the torque transmitting mechanisms 354 and 358. This establishes the sun gear member 332 and the planet carrier assembly member 346 as reaction members in the planetary gear arrangement 318 and the sun gear member 322 is an input member. The first continuous interconnection 370 becomes a rotating reaction member resulting in the forward rotation of the planet carrier assembly member 326 and the ring gear member 324. The sun gear member 342 is driven forwardly resulting in reverse rotation of the ring gear member 344 and the output shaft O. The numerical value of the reverse speed ratio is determined by the ring/sun tooth ratios of the planetary gear sets 320, 330, and 340.

A forward first speed ratio is established by the engagement of the torque transmitting mechanisms 358 and 350. This establishes planet carrier assembly members 346 and 326 as reaction members and the sun gear member 322 is the input member. The ring gear member 324 and the sun gear member 342 are driven in reverse at a speed determined by the ring/sun tooth ratio of the planetary gear set 320. The ring gear member 344 and the output shaft O are driven forwardly at a speed determined by the speed of the sun gear member 342 and the ring/sun tooth ratio of the planetary gear set 340. The overall numerical ratio of the first forward speed ratio is determined by the ring/sun tooth ratios of the planetary gear sets 320 and 340.

A first to second forward speed ratio interchange is accomplished by the swapping of the torque transmitting mechanisms 358 and 356 while the torque transmitting mechanism 350 remains engaged. This is a single transition interchange. The first continuous interconnection 370 is held stationary resulting in the ring gear member 324 and the sun gear member 342 becoming reaction members. The planet carrier assembly member 326 and the planet carrier assembly member 346 are driven forwardly at a reduce speed determined by the ring/sun tooth ratio of the planetary gear set 320. The ring gear member 344 and the output shaft O are driven forwardly at a reduced speed determined by the speed of the planet carrier assembly member 346 and the ring/sun tooth ratio of the planetary gear set 340. The numerical value of the second forward speed ratio is determined by the ring/sun tooth ratios of the planetary gear sets 320 and 340.

A second to third forward speed ratio interchange is accomplished by swapping the torque transmitting mechanisms 356 and 354 while the torque transmitting mechanism 350 remains engaged. This is a single transition interchange. The sun gear member 332 is established as a reaction member and the sun gear member 322 is the input member. The ring gear member 334, planet carrier assembly member 326 and the planet carrier assembly member 346 become rotating reaction members. The ring gear member 344 is driven forwardly at a speed determined by the speed of the sun gear member 342, the planet carrier assembly member 346 and the ring/sun tooth ratio of the planetary gear set 340. The numerical value of the third forward speed ratio is determined by the ring/sun tooth ratios of the planetary gear sets 320, 330, and 340.

A third to fourth speed ratio interchange is accomplished by swapping the torque transmitting mechanisms 354 and 352 while the torque transmitting mechanism 350 remains engaged. This is a single transition interchange. This connects all of the sun gear member 322, the planet carrier assembly member 326, the ring gear member 334, and the planet carrier assembly member 346 with the input shaft. The fourth forward speed ratio is a one-to-one drive wherein the input speed and the output speed are equal.

A fourth to fifth forward speed ratio interchange is accomplished by swapping the torque transmitting mechanisms 350 and 354. This establishes the sun gear member 332 as a reaction member and the sun gear member 322 and the planet carrier assembly member 346 as input members. The sun gear member 342, ring gear member 324 and planet carrier assembly member 336 become rotating reaction members. The ring gear member 344 and the output shaft O rotate forwardly at a speed greater than the input speed. The overall numerical value of the fifth forward speed ratio is determined by all of the planetary gear sets 320, 330, and 340.

A fifth to sixth forward speed ratio interchange is accomplished by swapping the torque transmitting mechanisms 354 and 356 while the torque transmitting mechanism 352 remains engaged. This is a single transition interchange. The first continuous interconnection 370 is held stationary and the sun gear member 342 becomes a reaction member. The planet carrier assembly member 346 is the input member. The ring gear member 344 is driven forwardly at a speed greater than the input speed. The numerical value of the sixth forward speed is determined by the ring/sun tooth ratio of the planetary gear set 340.

The truth table and chart of FIG. 8 describe the engagement sequence of the torque transmitting mechanisms for the various speed ratios, the actual ratios numbers for the given ring/sun ratios, and the numerical value of the ratio steps between adjacent ratios. In the truth table of FIG. 8, R1 represents the number of teeth on the ring gear member 324, S1 represents the number of teeth on the sun gear member 322, R2 represents the number of teeth on the ring gear member 334, S2 represents the number of teeth on the sun gear member 332, R3 represents the number of teeth on the ring gear member 344, and S3 represents the number of teeth on the sun gear member 342. It should be noted that the torque transmitting mechanism 358 can remain engaged during a reverse to forward gear change as the transmission passes through neutral. Also double step interchanges such as $1^{st}$ to $3^{rd}$, $2^{nd}$ to $4^{th}$, $3^{rd}$ to $5^{th}$, and $4^{th}$ to $6^{th}$ are single transition interchanges.

Figures 9, 10:
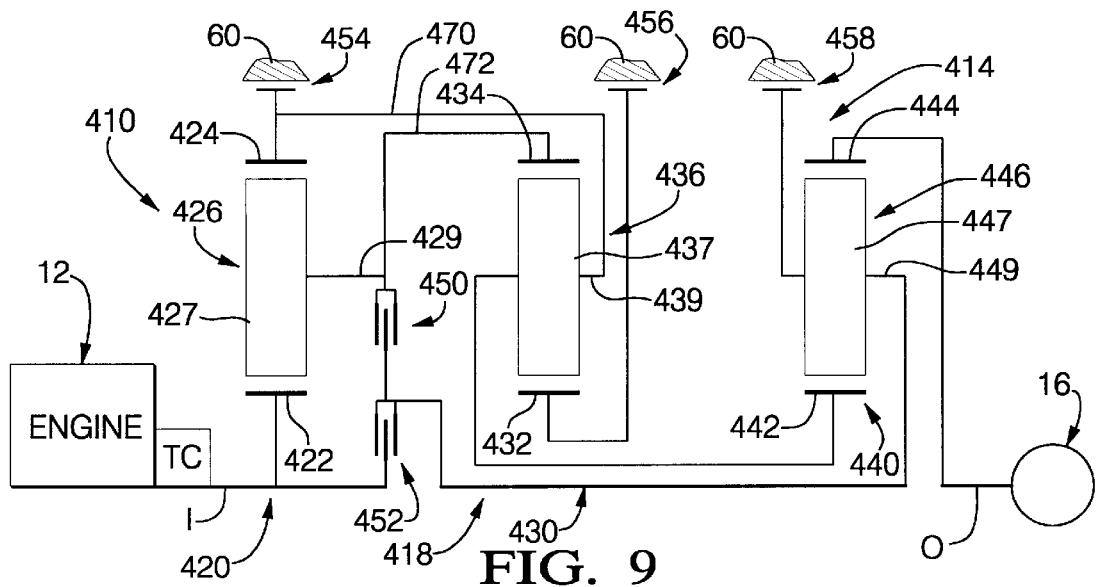
FIG. 9 is a schematic diagram of a powertrain having a transmission incorporating an embodiment of the present invention.
FIG. 10 is a truth table of the shift sequence of the transmission of FIG. 9 and the ratio steps between adjacent drive ratios.

A powertrain 410, shown in FIG. 9, has the conventional engine and torque converter 12, a planetary transmission 414, and the conventional final drive 16. The engine and torque converter 12 are drivingly connected with the transmission 414 through an input shaft I. The transmission is drivingly connected with the final drive 16 through an output shaft O. The planetary transmission 414 includes a planetary gear arrangement 418 that includes a first planetary gear set 420, a second planetary gear set 430 and a third planetary gear set 440. The planetary transmission also includes five torque transmitting mechanism 450, 452, 454, 456, and 458 which are conventional selectively engageable fluid operated devices. The torque transmitting mechanisms 450 and 452 are rotating type mechanisms which are commonly termed clutches. The torque transmitting mechanisms 454, 456 and 458 are stationary type mechanisms which are commonly termed brakes. The torque transmitting mechanisms 454, 456, and 458 are connected to a stationary component of the transmission 414 such as the housing 60.

The planetary gear set 420 includes a sun gear member 422, a ring gear member 424, and a planet carrier assembly member 426 that has a plurality of planet pinion gear members 427 rotatably mounted on a planet carrier 429. The planetary gear set 430 includes a sun gear member 432, a ring gear member 434, and a planet carrier assembly member 436 that has a plurality of planet pinion gears 437 rotatably mounted on a planet carrier 439. The planetary gear set 440 has a sun gear member 442, a ring gear member 444, and a planet carrier assembly member 446 that includes a plurality of planet pinion gears 447 rotatably mounted on a planet carrier 449.

The sun gear member 422 is continuously connected with the input shaft I and the ring gear member 444 is continuously connected with the output shaft O. The ring gear member 424, the planet carrier assembly member 436 and the planet carrier assembly member 446 are continuously interconnected by a first continuous interconnection 470. The planet carrier assembly member 426 and the ring gear member 434 are continuously interconnected by a second continuous interconnection 472. The planet carrier assembly member 446 is selectively connectable with the input shaft I by the torque transmitting mechanism 452 and with the housing 60 by the torque transmitting mechanism 458. The sun gear member 432 is selectively connectable with the housing 60 by the torque transmitting mechanism 456. The first continuous interconnection is selectively connectable with the housing 60 by the torque transmitting mechanism 454. The second continuous interconnection is selectively connectable with the planet carrier assembly member 446 by the torque transmitting mechanism 450. The second continuous interconnection can be selectively connected with the input shaft 60 by the simultaneous engagement of both torque transmitting mechanisms 450 and 452, or with the housing 60 by the simultaneous engagement of both torque transmitting mechanisms 450 and 458. The planetary gear arrangement 418 provides six forward speed ratios and one reverse speed ratio through the selective engagement of the torque transmitting mechanisms in combination of two. A neutral condition is attained by disengagement of all of the torque transmitting mechanisms or by the engagement of torque transmitting mechanism 458 only.

The reverse speed ratio is attained by the engagement of the torque transmitting mechanisms 456 and 458. This establishes the sun gear member 432 and the planet carrier assembly member 446 as stationary reaction members. The first continuous interconnection becomes a rotating reaction member. The sun gear member 442 rotates forwardly and the ring gear member 444 and the output shaft O rotates in reverse at a reduced ratio. The overall numerical value of the reverse speed ratio is determined by the ring/sun tooth ratios of the planetary gear sets 420, 430, and 440.

The first forward speed ratio is attained by the engagement of the torque transmitting mechanisms 458 and 450. This establishes the planet carrier assembly member 426 and the planet carrier assembly member 446 as stationary reaction members. The sun gear member 422 is the input member. The ring gear member 424 and the sun gear member 442 rotate opposite the input shaft at a reduced speed resulting in the forward rotation of the ring gear member 444 and the output shaft O. The overall numerical value of the first forward speed ratio is determined by the ring/sun tooth ratios of the planetary gear sets 420 and 440.

A first to second forward speed ratio interchange is effected with the swapping of the torque transmitting mechanisms 458 and 454 while the torque transmitting mechanism 450 remains engaged. This establishes the ring gear member 424 and the sun gear member 442 as stationary reaction members. The planet carrier assembly members 426 and 446 are driven forwardly at a reduced speed determined by the ring/sun tooth ratio of the planetary gear set 420. The ring gear member 444 and the output shaft O are driven forwardly at a reduced speed determined by the speed of the planet carrier assembly member 446 and the ring/sun tooth ratio of the planetary gear set 440. The overall numerical value of the second forward speed ratio is determined by the ring/sun tooth ratios of the planetary gear sets 420 and 440.

A second to third forward speed ratio interchange is effected with the swapping of the torque transmitting mechanisms 454 and 456 while the torque transmitting mechanism 450 remains engaged. This establishes sun gear member 432 as a stationary reaction member. The first continuous interconnection 470 becomes a rotating reaction member such that the planet carrier assembly member 426, the ring gear member 434 and the planet carrier assembly member 446 are driven forwardly at a reduced speed. The rotating reaction also rotates forwardly at a reduced speed. The ring gear member 444 and the output shaft O rotate forwardly at a reduced speed. The overall numerical value of the third forward speed ratio is determined by the ring/sun tooth ratios of the planetary gear sets 420, 430, and 440.

A third to fourth forward speed ratio interchange is effected with the swapping of the torque transmitting mechanisms 456 and 452 while the torque transmitting mechanism 450 remains engaged. This is a single transition interchange. The engagement of the torque transmitting mechanisms 450 and 452 places the planetary gear arrangement in a one-to-one condition wherein the input and output speeds are the same.

A fourth to fifth forward speed ratio interchange is effected with the swapping of the torque transmitting mechanisms 450 and 456 while the torque transmitting mechanism 452 remains engaged. This establishes sun gear member 432 as a stationary reaction member and the first continuous interconnection 470 is a rotating reaction member. The planet carrier assembly member 446 and the sun gear member 442 both rotate forwardly resulting in a forward rotation of the ring gear member 444 and the output shaft O at an increased speed relative to the input shaft I. The overall numerical value of the fifth forward speed ratio is determined by the ring/sun tooth ratios of the planetary gear sets 420, 430, and 440.

A fifth to sixth forward speed ratio interchange is effected with the interchange of the torque transmitting mechanisms 456 and 454 while the torque transmitting mechanism 452 remains engaged. This establishes the sun gear member 442 as a stationary reaction member and the planet carrier assembly member 446 as an input member. The ring gear member 444 and the output shaft O rotate forwardly at an increased speed relative to the input shaft I. The overall numerical value of the sixth forward speed ratio is determined by the ring/sun tooth ratio of the planetary gear set 440.

The truth table and chart of FIG. 10 describe the engagement sequence of the torque transmitting mechanisms for the various speed ratios, the actual ratios numbers for the given ring/sun ratios, and the numerical value of the ratio steps between adjacent ratios. In the truth table of FIG. 10, R1 represents the number of teeth on the ring gear member 424, S1 represents the number of teeth on the sun gear member 422, R2 represents the number of teeth on the ring gear member 434, S2 represents the number of teeth on the sun gear member 432, R3 represents the number of teeth on the ring gear member 444, and S3 represents the number of teeth on the sun gear member 442. It should be noted that the torque transmitting mechanism 458 can remain engaged during a reverse to forward gear change as the transmission passes through neutral. Also double step interchanges such as $1^{st}$ to $3^{rd}$, $2^{nd}$ to $4^{th}$, $3^{rd}$ to $5^{th}$, and $4^{th}$ to $6^{th}$ are single transition interchanges.

Figures 11, 12:
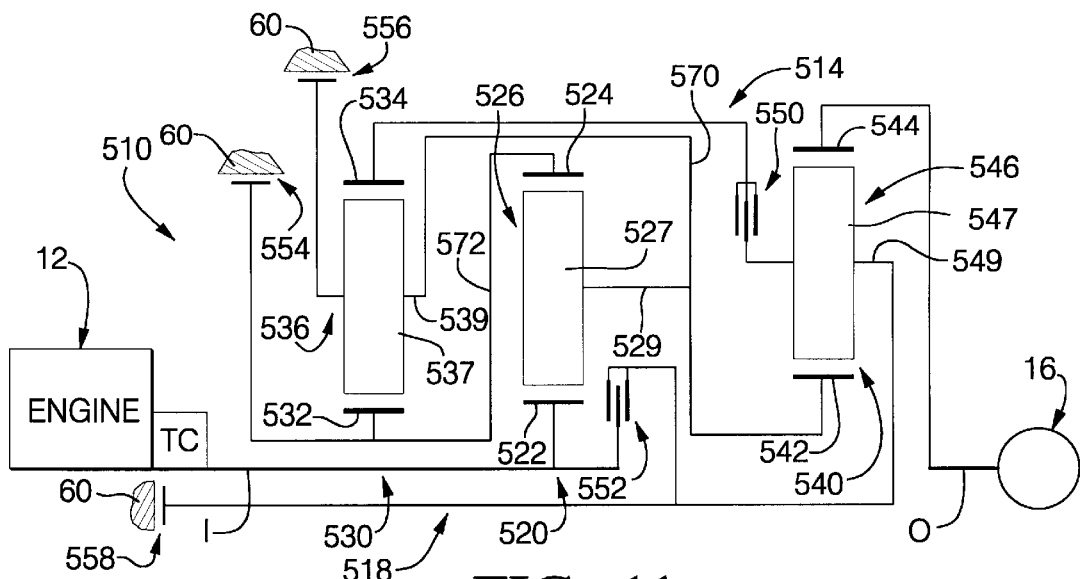
FIG. 11 is a schematic diagram of a powertrain having a transmission incorporating an embodiment of the present invention.
FIG. 12 is a truth table of the shift sequence of the transmission of FIG. 11 and the ratio steps between adjacent drive ratios.

A powertrain 510, shown in FIG. 11, has the conventional engine and torque converter 12, a planetary transmission 514, and the conventional final drive 16. The engine and torque converter 12 are drivingly connected with the transmission 514 through an input shaft I. The transmission is drivingly connected with the final drive 16 through an output shaft O. The planetary transmission 514 includes a planetary gear arrangement 518 that includes a first planetary gear set 520, a second planetary gear set 530 and a third planetary gear set 540. The planetary transmission also includes five torque transmitting mechanism 550, 552, 554, 556, and 558 which are conventional selectively engageable fluid operated devices. The torque transmitting mechanisms 550 and 552 are rotating type mechanisms which are commonly termed clutches. The torque transmitting mechanisms 554, 556 and 558 are stationary type mechanisms which are commonly termed brakes. The torque transmitting mechanisms 554, 556, and 558 are connected to a stationary component of the transmission 514 such as the housing 60.

The planetary gear set 520 includes a sun gear member 522, a ring gear member 524, and a planet carrier assembly member 526 that has a plurality of planet pinion gear members 527 rotatably mounted on a planet carrier 529. The planetary gear set 530 includes a sun gear member 532, a ring gear member 534, and a planet carrier assembly member 536 that has a plurality of planet pinion gears 537 rotatably mounted on a planet carrier 539. The planetary gear set 540 has a sun gear member 542, a ring gear member 544, and a planet carrier assembly member 546 that includes a plurality of planet pinion gears 547 rotatably mounted on a planet carrier 549.

The sun gear member 522 is continuously connected with the input shaft I and the ring gear member 544 is continuously connected with the output shaft O. The planet carrier assembly member 526, the planet carrier assembly member 536 and the sun gear member 542 are continuously interconnected by a first continuous interconnection 570 which is also selectively connect able with the housing 60 by the torque transmitting mechanism 556. The sun gear member 532 and the ring gear member 524 are continuously interconnected by a second continuous interconnection 572 which is selectively connectable with the housing 60 by the torque transmitting mechanism 554. The planet carrier assembly member 546 is selectively connectable with the ring gear member 534 by the torque transmitting mechanism 550, with the input shaft I and sun gear member 522 by the torque transmitting mechanism 552 and with the housing 60 by the torque transmitting mechanism 558. The simultaneous engagement of the torque transmitting mechanisms 550 and 558 will connect both the ring gear member 534 and the planet carrier assembly member 546 with the housing. The planetary gear transmission 514 will provide six forward speed ratios and one reverse speed ratio between the input shaft I and the output shaft O through the judicious selective operation of the torque transmitting mechanisms 550, 552, 554, 556, and 558 in combinations of two. A neutral condition is provided in the transmission 514 by disengaging all of the torque transmitting mechanisms. If desired the torque transmitting mechanism 558 may be engaged during the neutral condition.

The reverse speed ratio is established by the engagement of the torque transmitting mechanisms 554 and 558. This establishes the ring gear member 524 and the planet carrier assembly member 546 as stationary reaction members. The sun gear member 522 is the input member. The planet carrier assembly member 526 and the sun gear member 542 are driven forwardly at a reduced speed determined by the ring/sun tooth ratio of the planetary gear set 520. The ring gear member 544 and the output shaft O are driven in reverse at a reduced speed determined by the speed of the sun gear member 542 and the ring/sun tooth ratio of the planetary gear set 540. The overall numerical value of the reverse speed ratio is determined by the ring/sun tooth ratio of the planetary gear sets 520 and 540.

The first forward speed ratio is established by the engagement of the torque transmitting mechanisms 550 and 558. This establishes the ring gear member 534 and the planet carrier assembly member 546 as stationary reaction members and the sun gear member 522 is the input member. The first continuous interconnection 570 is a rotating reaction member. The forward rotation of the input shaft I and the sun gear member 522 results in reverse rotation of the sun gear member 532, the planet carrier assembly member 526 and the sun gear member 542 at a reduced speed determined by the ring/sun tooth ratios of the planetary gear sets 520 and 530. The ring gear member 544 and the output shaft O rotate forwardly at a reduce speed determined by the speed of the sun gear member 542 and the ring/sun tooth ratio of the planetary gear set 540. The overall numerical value of the first forward ratio is determined by the ring/sun tooth ratios of the planetary gear sets 520, 530, and 540.

A first to second forward speed ratio interchange is effected by swapping the torque transmitting mechanisms 558 and 556 while the torque transmitting mechanism 550 remains engaged. This is a single transition interchange. This establishes the planet carrier assembly member 536, the planet carrier assembly member 526 and the sun gear member 542 as stationary reaction members. The sun gear member 522 is the input member. The ring gear member 524 and the sun gear member 532 are driven in reverse at a reduced speed determined by the ring/sun tooth ratio of the planetary gear set 520. The ring gear member 534 and the planet carrier assembly member 546 are driven forwardly at a reduced speed determined by the speed of the sun gear member 532 and the ring/sun tooth ratio of the planetary gear set 530. The ring gear member 544 and the output shaft O are driven forwardly at a reduced speed determined by the speed of the planet carrier assembly member 546 and the ring/sun tooth ratio of the planetary gear set 540. The overall numerical ratio of the second forward speed ratio is determined by all of the planetary gear sets 520, 530, and 540.

A second to third forward speed ratio interchange is provided by the swapping of the torque transmitting mechanisms 556 and 554 while the torque transmitting mechanism 550 remains engaged. This is a single transition interchange. This establishes the ring gear member 524 and the sun gear member 532 as stationary reaction members and the sun gear member 522 is the input member. The planet carrier assembly member 526, the planet carrier assembly member 536, and the sun gear member 542 are driven forwardly at a reduced speed determined by the ring/sun tooth ratio of the planetary gear set 520. The ring gear member 534 and the planet carrier assembly member 546 are driven forwardly at a reduced speed determined by the speed of the planet carrier assembly member 536 and the ring/sun tooth ratio of the planetary gear set 530. The ring gear member 544 and the output shaft O are driven forwardly at a reduced speed determined by the speed of the planet carrier assembly member 546, the speed of the sun gear member 542, and the ring/sun tooth ratio of the planetary gear set 540. The overall numerical value of the third forward speed ratio is determined by the ring/sun tooth ratios of all of the planetary gear sets 520, 530, and 540.

A third to fourth forward speed ratio interchange is established by the interchange of the torque transmitting mechanisms 554 and 552 while the torque transmitting mechanism 550 remains engaged. This is a single transition interchange. This places the planetary gear arrangement in a one-to-one or direct drive condition where the input and output speeds are equal.

A fourth to fifth forward speed ratio interchange is established by the interchange of the torque transmitting mechanisms 550 and 554 while the torque transmitting mechanism 552 remains engaged. This is a single transition interchange. The ring gear member 524 is a stationary reaction member and the sun gear member 522 and the planet carrier assembly member 546 are input members. The planet carrier assembly member 526 and the sun gear member 542 are driven forwardly at a reduced speed determined by the ring/sun tooth ratio of the planetary gear set 520. The ring gear member 544 and the output shaft O are driven forwardly at a speed greater than the input speed as determined by the speed of the sun gear member 542, the planet carrier assembly member 546 and the ring/sun tooth ratio of the planetary gear set 540. The overall numerical value of the fifth forward speed ratio is determined by the planetary gear sets 520 and 540.

A fifth to sixth forward speed ratio interchange is effected by swapping the torque transmitting mechanisms 554 and 556 while the torque transmitting mechanism 552 remains engaged. This is a single transition interchange. The sun gear member 542 is established as a stationary reaction member and the planet carrier assembly member 546 is the input member. The ring gear member 544 rotates forwardly at a speed greater than the input speed. The overall numerical value of the sixth forward speed ratio is determined by the ring/sun tooth ratio of the planetary gear set 540.

The truth table and chart of FIG. 12 describe the engagement sequence of the torque transmitting mechanisms for the various speed ratios, the actual ratios numbers for the given ring/sun ratios, and the numerical value of the ratio steps between adjacent ratios. In the truth table of FIG. 12, R1 represents the number of teeth on the ring gear member 524, S1 represents the number of teeth on the sun gear member 522, R2 represents the number of teeth on the ring gear member 534, S2 represents the number of teeth on the sun gear member 532, R3 represents the number of teeth on the ring gear member 544, and S3 represents the number of teeth on the sun gear member 542. It should be noted that the torque transmitting mechanism 558 can remain engaged during a reverse to forward gear change as the transmission passes through neutral. Also double step interchanges such as $1^{st}$ to $3^{rd}$, $2^{nd}$ to $4^{th}$, $3^{rd}$ to $5^{th}$, and $4^{th}$ to $6^{th}$ are single transition interchanges.

Figures 13, 14:
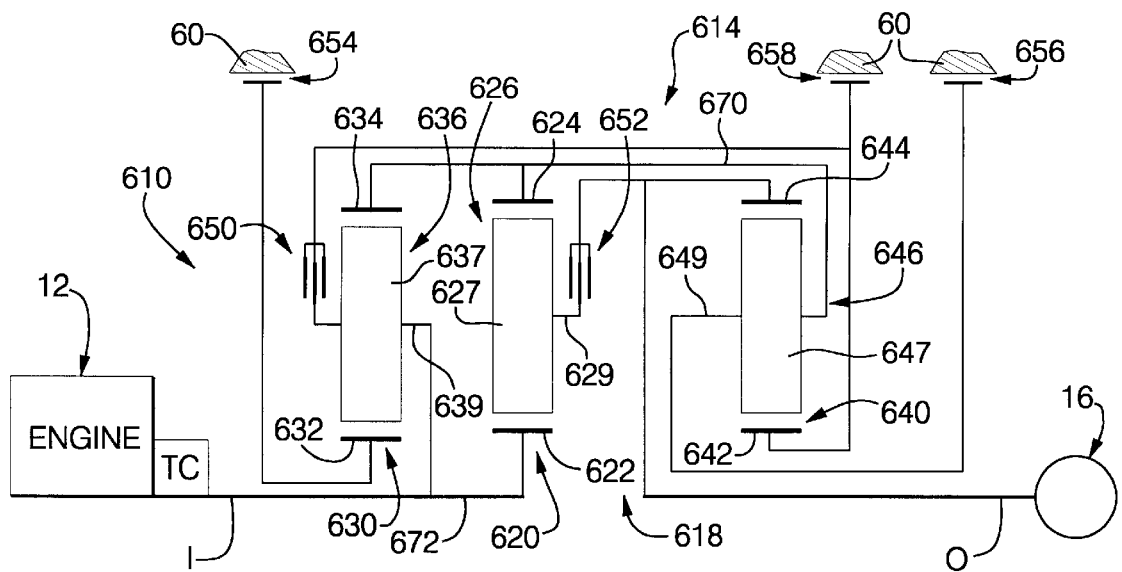
FIG. 13 is a schematic diagram of a powertrain having a transmission incorporating an embodiment of the present invention.
FIG. 14 is a truth table of the shift sequence of the transmission of FIG. 13 and the ratio steps between adjacent drive ratios.

A powertrain 610, shown in FIG. 13, has the conventional engine and torque converter 12, a planetary transmission 614, and the conventional final drive 16. The engine and torque converter 12 are drivingly connected with the transmission 614 through an input shaft I. The transmission is drivingly connected with the final drive 16 through an output shaft O. The planetary transmission 614 includes a planetary gear arrangement 618 that includes a first planetary gear set 620, a second planetary gear set 630 and a third planetary gear set 640. The planetary transmission also includes five torque transmitting mechanism 650, 652, 654, 656, and 658 which are conventional selectively engageable fluid operated devices. The torque transmitting mechanisms 650 and 652 are rotating type mechanisms which are commonly termed clutches. The torque transmitting mechanisms 654, 656 and 658 are stationary type mechanisms which are commonly termed brakes. The torque transmitting mechanisms 654, 656, and 658 are connected to a stationary component of the transmission 614 such as the housing 60.

The planetary gear set 620 includes a sun gear member 622, a ring gear member 624, and a planet carrier assembly member 626 that has a plurality of planet pinion gear members 627 rotatably mounted on a planet carrier 629. The planetary gear set 630 includes a sun gear member 632, a ring gear member 634, and a planet carrier assembly member 636 that has a plurality of planet pinion gears 637 rotatably mounted on a planet carrier 639. The planetary gear set 640 has a sun gear member 642, a ring gear member 644, and a planet carrier assembly member 646 that includes a plurality of planet pinion gears 647 rotatably mounted on a planet carrier 649.

The sun gear member 622 and the planet carrier assembly member 636 are continuously interconnected by a second continuous interconnection 672 and also continuously connected with the input shaft I. The ring gear member 644 is continuously connected with the output shaft O. The ring gear member 624, the ring gear member 634 and the planet carrier assembly member 646 are continuously interconnected by a first continuous interconnection 670 which is also selectively connectable with the housing 60 by the torque transmitting mechanism 656. The sun gear member 642 is selectively connectable with the second continuous interconnection 672 through the planet carrier assembly member 636 by the torque transmitting mechanism 650 and selectively connectable with the housing 60 by the torque transmitting mechanism 658. The sun gear member 632 is selectively connectable with the housing 60 by the torque transmitting mechanism 654. The planet carrier assembly member 626 is selectively with the ring gear member 644 and the output shaft O by the torque transmitting mechanism 652. The planetary gear transmission 614 will provide six forward speed ratios and one reverse speed ratio between the input shaft I and the output shaft O through the judicious engagement of the torque transmitting mechanisms 650, 652, 654, 656, and 658 in combinations of two. A neutral condition is also available in the transmission 614 during which the torque transmitting mechanism 656 can be engaged.

The reverse speed ratio is established by the engagement of the torque transmitting mechanisms 650 and 656. This establishes the planet carrier assembly member 646 as a reaction member and the sun gear member 642 as an input member. Forward rotation of the sun gear member 642 results in a reduced speed reverse rotation of the ring gear member 644 and the output shaft O. The numerical value of the reverse speed ratio is determined by the ring/sun tooth ratio of the planetary gear set 640.

The first forward speed ratio is established by the engagement of the torque transmitting mechanisms 656 and 652. This establishes the ring gear member 624 as a reaction member, the planet carrier assembly member 626 as an output member, and the sun gear member 620 is an input member. The planet carrier assembly member 626 and the output shaft O rotate forwardly at a reduced speed relative to the input shaft I. The numerical value of the first forward speed ratio is determined by the ring/sun tooth ratio of the planetary gear set 620.

A first to second forward speed ratio interchange is attained by the swapping of the torque transmitting mechanisms 656 and 658 while the torque transmitting mechanism 652 remains engaged. This is a single transition interchange. The sun gear member 642 is the reaction member and the sun gear member 622 is the input member. The ring gear member 624 rotates at a reduced speed. The ring gear member 644 and the output shaft O are driven forwardly at a reduced speed relative to the sun gear member 642. The numerical value of the second forward speed ratio is determined by the planetary gear sets 620 and 640.

A second to third forward speed ratio interchange is achieved by the swapping of the torque transmitting mechanisms 658 and 650 while the torque transmitting mechanism 652 remains engaged. This is a single transition interchange. This conditions the planetary gear arrangement for a one-to-one ratio wherein the input shaft I and the output shaft O rotate in unison.

A third to fourth forward speed ratio interchange is attained by the swapping of the torque transmitting mechanisms 650 and 654 while the torque transmitting mechanism 652 remains engaged. This is a single transition interchange. The sun gear member 632 is a reaction member and the sun gear member 622 and the planet carrier assembly member 636 are connected with the input shaft I. The ring gear member 634 and the ring gear member 626 are driven forwardly at an increased speed relative to the input shaft I while the sun gear member 622 is driven forwardly at the speed of the input shaft I. This results in the planet carrier assembly member 622 and the output shaft O being driven forwardly at a speed greater than the input speed. The numerical value of the fourth forward speed ratio is determined by the ring/sun tooth ratio of the planetary gear sets 620 and 630.

A fourth to fifth forward speed ratio interchange is achieved by the swapping of the torque transmitting mechanisms 652 and 650 while the torque transmitting mechanism 654 remains engaged. This is a single transition interchange. The sun gear member 632 is a reaction member and the sun gear member 642 is connected with the input shaft I. The ring gear member 634 and the planet carrier assembly member 646 are driven forwardly at an increased speed and the sun gear member 642 is driven forwardly at the speed of the input shaft I. This results in an increased speed, relative to the input shaft I, at the ring gear member 644 and the output shaft O. The numerical value of the fifth forward speed ratio is determined by the planetary gear sets 630 and 640.

A fifth to sixth forward speed ratio interchange is attained by the swapping of the torque transmitting mechanisms 650 and 658 while the torque transmitting mechanism 654 remains engaged. This is a single transition interchange. The sun gear member 632 and the sun gear member 642 are reaction members in the planetary gear arrangement 614 and the planet carrier assembly member 636 is the input member. The ring gear member 634 and the planet carrier assembly member 646 are driven forwardly at an increased speed resulting in the ring gear member 644 and the output shaft O rotating forwardly at an increased speed. The numerical value of the sixth forward speed ratio is determined by the ring/sun tooth ratio of the planetary gear sets 630 and 640. The speed of the output shaft O during operation in the sixth forward speed ratio is faster than in the fifth forward speed ratio for a given input speed since the sun gear member 646 is stationary during the sixth forward speed ratio.

The truth table and chart of FIG. 14 describe the engagement sequence of the torque transmitting mechanisms for the various speed ratios, the actual ratios numbers for the given ring/sun ratios, and the numerical value of the ratio steps between adjacent ratios. In the truth table of FIG. 14, R1 represents the number of teeth on the ring gear member 624, S1 represents the number of teeth on the sun gear member 622, R2 represents the number of teeth on the ring gear member 634, S2 represents the number of teeth on the sun gear member 632, R3 represents the number of teeth on the ring gear member 644, and S3 represents the number of teeth on the sun gear member 642. It should be noted that the torque transmitting mechanism 656 can remain engaged during a reverse to forward gear change as the transmission passes through neutral. Also double step interchanges such as $1^{st}$ to $3^{rd}$, $2^{nd}$ to $4^{th}$, $3^{rd}$ to $5^{th}$, and $4^{th}$ to $6^{th}$ are single transition interchanges.

Figures 15, 16:
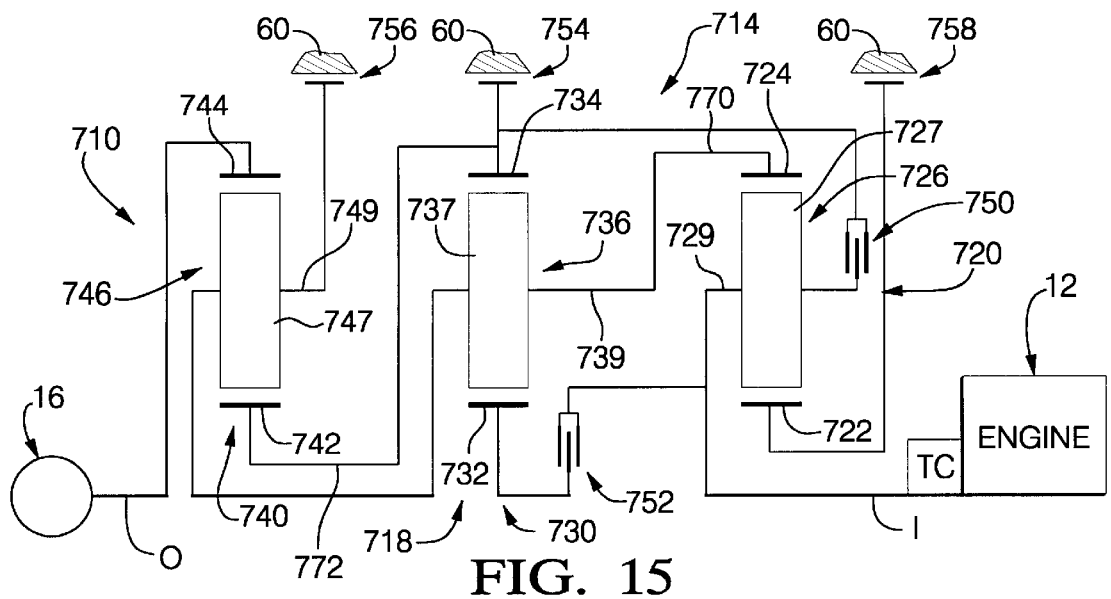
FIG. 15 is a schematic diagram of a powertrain having a transmission incorporating an embodiment of the present invention.
FIG. 16 is a truth table of the shift sequence of the transmission of FIG. 15 and the ratio steps between adjacent drive ratios.

A powertrain 710, shown in FIG. 15, has the conventional engine and torque converter 12, a planetary transmission 714, and the conventional final drive 16. The engine and torque converter 12 are drivingly connected with the transmission 714 through an input shaft I. The transmission is drivingly connected with the final drive 16 through an output shaft O. The planetary transmission 714 includes a planetary gear arrangement 718 that includes a first planetary gear set 720, a second planetary gear set 730 and a third planetary gear set 740. The planetary transmission also includes five torque transmitting mechanism 750, 752, 754, 756, and 758 which are conventional selectively engageable fluid operated devices. The torque transmitting mechanisms 750 and 752 are rotating type mechanisms which are commonly termed clutches. The torque transmitting mechanisms 754, 756 and 758 are stationary type mechanisms which are commonly termed brakes. The torque transmitting mechanisms 754, 756, and 758 are connected to a stationary component of the transmission 714 such as the housing 60.

The planetary gear set 720 includes a sun gear member 722, a ring gear member 724, and a planet carrier assembly member 726 that has a plurality of planet pinion gear members 727 rotatably mounted on a planet carrier 729. The planetary gear set 730 includes a sun gear member 732, a ring gear member 734, and a planet carrier assembly member 736 that has a plurality of planet pinion gears 737 rotatably mounted on a planet carrier 739. The planetary gear set 740 has a sun gear member 742, a ring gear member 744, and a planet carrier assembly member 746 that includes a plurality of planet pinion gears 747 rotatably mounted on a planet carrier 749.

The planet carrier assembly member 726 is continuously connected with the input shaft I and the ring gear member 744 is continuously connected with the output shaft O. The sun gear member 722 is selectively connectable with the housing 60 by the torque transmitting mechanism 758. The ring gear member 724, the planet carrier assembly member 736, and the planet carrier assembly member 746 are continuously interconnected by a first continuous interconnection 770 which is selectively connectable with the housing 60 by the torque transmitting mechanism 756. The ring gear member 734 and the sun gear member 742 are continuously interconnected by a second continuous interconnection 772 which is selectively connectable with the planet carrier assembly member 726 and the input shaft I by the torque transmitting mechanism 750. The sun gear member 732 is selectively connectable with the planet carrier assembly member 726 and the input shaft I by the torque transmitting mechanism 752. The planetary gear arrangement 718 will provide six forward speed ratios and one reverse speed ratio between the input shaft I and the output shaft O through the selective engagement of the torque transmitting mechanisms 750, 752, 754, 756, and 758 in combinations of two. A neutral condition is also available in the transmission 714 during which the torque transmitting mechanism 756 can be engaged.

The reverse speed ratio is established by the engagement of the torque transmitting mechanisms 750 and 756. This establishes the planet carrier assembly member 746 as a reaction member and the sun gear member 742 as an input member. The forward rotation of the sun gear member 742 results in reverse rotation of the ring gear member 744 and the output shaft O at a reduced speed. The numerical value of the reverse speed ratio is determined by the ring/sun tooth ratio of the planetary gear set 740.

The first forward speed ratio is established by the engagement of the torque transmitting mechanisms 752 and 756. This establishes the ring gear member 724 and the planet carrier assembly member 746 as reaction members and the sun gear member 732 as the input member. The forward rotation of the sun gear member 732 results in reverse rotation of the ring gear member 734 and the sun gear member 742 at a reduced speed. The ring gear member 744 and the output shaft O are driven forwardly at a reduced speed. The numerical value of the first forward speed ratio is determined by the planetary gear sets 730 and 740.

A first to second forward speed ratio interchange is accomplished by swapping the torque transmitting mechanisms 756 and 754 while the torque transmitting mechanism 752 remains engaged. This is a single transition interchange. The ring gear member 734 and the sun gear member 742 are reaction members and the sun gear member 732 is an input member. The forward rotation of the sun gear member 732 results in forward rotation of the planet carrier assembly members 736 and 746 at a reduced speed. The ring gear member 744 and the output shaft O are driven forwardly at a reduced speed. The numerical value of the second forward speed ratio is determined by the planetary gear sets 730 and 740.

A second to third forward speed ratio interchange is achieved by swapping the torque transmitting mechanisms 754 and 750 while the torque transmitting mechanism 752 remains engaged. This is a single transition shift. The simultaneous engagement of the torque transmitting mechanisms 750 and 752 places the planetary gear arrangement 718 in a one-to-one condition such that the speed of the input shaft I and the output shaft O are equal.

A third to fourth forward speed ratio interchange is attained by swapping the torque transmitting mechanisms 750 and 758 while the torque transmitting mechanism 752 remains engaged. This is a single transition shift. The sun gear member 722 is a stationary reaction member and the planet carrier assembly member 726 and the sun gear member 732 are input members. The ring gear member 724, planet carrier assembly member 736 and the planet carrier assembly member 746 are driven forwardly at an increased speed. The ring gear member 734 and the sun gear member 742 are driven forwardly at a speed determined by the speed of the sun gear member 732 (input), the speed of the planet carrier assembly member 736 and the ring/sun tooth ratio of the planetary gear set 730. The ring gear member 744 and the output shaft O are driven forwardly at a speed determined by the speed of the planet carrier assembly member 746, the speed of the sun gear member 742 and the ring/sun tooth ratio of the planetary gear set 740. With the ring/sun tooth ratios shown in FIG. 16, the fourth forward speed ratio is an overdrive ratio having a value determined by the ring/sun tooth ratios of the planetary gear sets 720, 730, and 740.

A fourth to fifth forward speed ratio interchange is established by the interchange of the torque transmitting mechanisms 752 and 750 while the torque transmitting mechanism 758 remains engaged. This is a single transition shift interchange. The sun gear member 722 is a reaction member and the planet carrier assembly member 726 and the sun gear member 742 are input members. The ring gear member 724 and the planet carrier assembly member 746 are driven forwardly at an increased speed determined by the ring/sun tooth ratio of the planetary gear set 720. The ring gear member 744 and the output shaft O are driven forwardly at an increased speed determined by the speed of the sun gear member 742 (input), the speed of the planet carrier assembly member 746 and the ring/sun tooth ratio of the planetary gear set 740. The numerical value of the fifth forward speed ratio is determined by the ring/sun tooth ratios of the planetary gear sets 720 and 740.

A fifth to sixth forward speed ratio interchange is established by the interchange of the torque transmitting mechanisms 750 and 754 while the torque transmitting mechanism 758 remains engaged. This is a single transition shift interchange. The sun gear member 722 and the sun gear member 742 are reaction members and the planet carrier assembly member 726 is the input member. The ring gear member 724 and the planet carrier assembly member 746 are driven forwardly at an increased speed determined by the ring/sun tooth ratio of the planetary gear set 720. The ring gear member 744 and the output shaft O are driven forwardly at an increased speed determined by the speed of the planet carrier assembly member 746 and the ring/sun tooth ratio of the planetary gear set 740. The numerical value of the sixth forward speed ratio is determined by the ring/sun tooth ratios of the planetary gear sets 720 and 740.

The truth table and chart of FIG. 16 describe the engagement sequence of the torque transmitting mechanisms for the various speed ratios, the actual ratios numbers for the given ring/sun ratios, and the numerical value of the ratio steps between adjacent ratios. In the truth table of FIG. 16, R1 represents the number of teeth on the ring gear member 724, S1 represents the number of teeth on the sun gear member 722, R2 represents the number of teeth on the ring gear member 734, S2 represents the number of teeth on the sun gear member 732, R3 represents the number of teeth on the ring gear member 744, and S3 represents the number of teeth on the sun gear member 742. It should be noted that the torque transmitting mechanism 756 can remain engaged during a reverse to forward gear change as the transmission passes through neutral. Also double step interchanges such as $1^{st}$ to $3^{rd}$, $2^{nd}$ to $4^{th}$, $3^{rd}$ to $5^{th}$, and $4^{th}$ to $6^{th}$ are single transition interchanges.

Figures 17, 18:
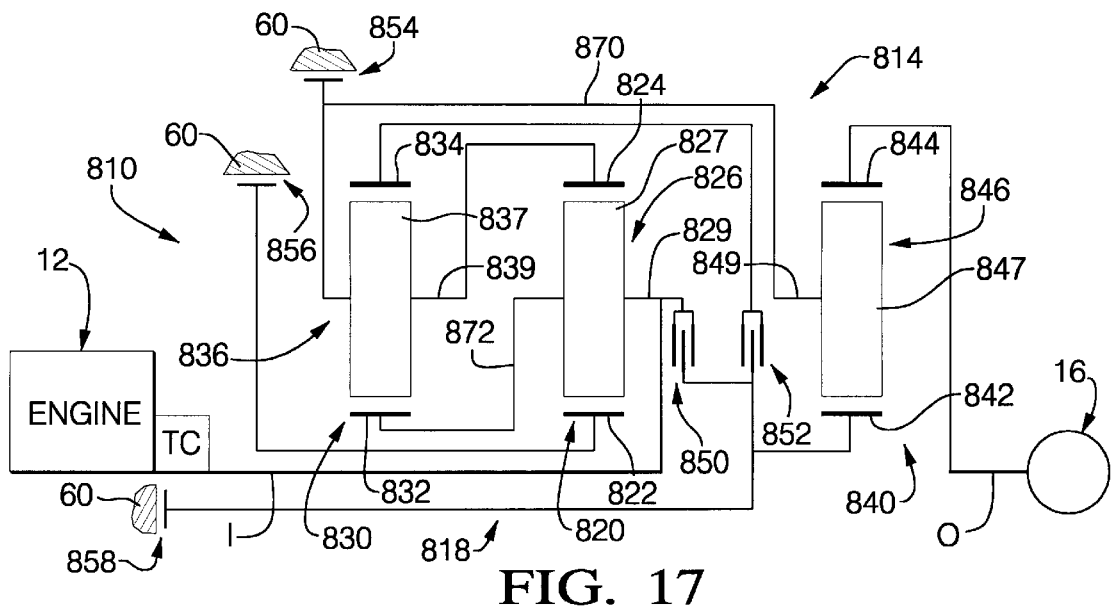
FIG. 17 is a schematic diagram of a powertrain having a transmission incorporating an embodiment of the present invention.
FIG. 18 is a truth table of the shift sequence of the transmission of FIG. 17 and the ratio steps between adjacent drive ratios.

A powertrain 810, shown in FIG. 17, has the conventional engine and torque converter 12, a planetary transmission 814, and the conventional final drive 16. The engine and torque converter 12 are drivingly connected with the transmission 814 through an input shaft I. The transmission is drivingly connected with the final drive 16 through an output shaft O. The planetary transmission 814 includes a planetary gear arrangement 818 that includes a first planetary gear set 820, a second planetary gear set 830 and a third planetary gear set 840. The planetary transmission also includes five torque transmitting mechanism 850, 852, 854, 856, and 858 which are conventional selectively engageable fluid operated devices. The torque transmitting mechanisms 850 and 852 are rotating type mechanisms which are commonly termed clutches. The torque transmitting mechanisms 854, 856 and 858 are stationary type mechanisms which are commonly termed brakes. The torque transmitting mechanisms 854, 856, and 858 are connected to a stationary component of the transmission 814 such as the housing 60.

The planetary gear set 820 includes a sun gear member 822, a ring gear member 824, and a planet carrier assembly member 826 that has a plurality of planet pinion gear members 827 rotatably mounted on a planet carrier 829. The planetary gear set 830 includes a sun gear member 832, a ring gear member 834, and a planet carrier assembly member 836 that has a plurality of planet pinion gears 837 rotatably mounted on a planet carrier 839. The planetary gear set 840 has a sun gear member 842, a ring gear member 844, and a planet carrier assembly member 846 that includes a plurality of planet pinion gears 847 rotatably mounted on a planet carrier 849.

The planet carrier assembly member 826 and the sun gear member 832 are continuously interconnected by a second continuous interconnection 872 and also continuously connected with the input shaft I. The ring gear member 844 is continuously connected with the output shaft O. The ring gear member 824, the planet carrier assembly member 836 and the planet carrier assembly member 846 are continuously interconnected by a first continuous interconnection 870 which is selectively connectable with the housing 60 through the torque transmitting mechanism 854. The sun gear member 842 is selectively connectable with the housing 60 through the torque transmitting mechanism 858, with the input shaft I and the second continuous interconnection 872 by the torque transmitting mechanism 850, and with the ring gear member 834 through the torque transmitting mechanism 852. The planetary gearing arrangement 818 will provide six forward speed ratios, one reverse ratio, and a neutral condition between the input shaft I and the output shaft O.

The truth table shown in FIG. 18 defines the torque transmitting mechanism engagement required for each of the forward speed ratios and the reverse speed ratio. The truth table also indicates that the torque transmitting mechanism 854 can remain engaged during the neutral condition thereby simplifying the first/reverse interchange. The numerical values for the ratios have been determined using the ring/sun tooth ratios given in FIG. 18. The R1/S1 value is the ring/sun tooth ratio of the planetary gear set 820, the R2/S2 value is the ring/sun tooth ratio of the planetary gear set 830, and the R3/S3 value is the ring/sun tooth ratio of the planetary gear set 840. As can be determined from the truth table, the single ratio interchanges for the forward speed ratios are single transition interchanges. Also double step interchanges such as $1^{st}$ to $3^{rd}$, $2^{nd}$ to $4^{th}$, $3^{rd}$ to $5^{th}$, and $4^{th}$ to $6^{th}$ are single interchanges. FIG. 18 also describes the step ratio between adjacent ratios, for example, the numerical step between $1^{st}$ and $2^{nd}$ is 1.56.

Those skilled in the art will recognize that the numerical value of the reverse speed ratio is determined by the planetary gear set 840. The numerical value of the first forward speed ratio is determined by the planetary gear sets 830 and 840. The numerical value of the second forward speed ratio is determined by the planetary gear sets 830 and 840. The third forward speed ratio is a one to one ratio. The numerical value of the fourth forward speed ratio is determined by the planetary gear sets 820, 830, and 840. The numerical value of the fifth forward speed ratio is determined by the planetary gear sets 820 and 840. The numerical value of the sixth forward speed ratio is determined by the planetary gear sets 820 and 840.

Figures 19, 20:
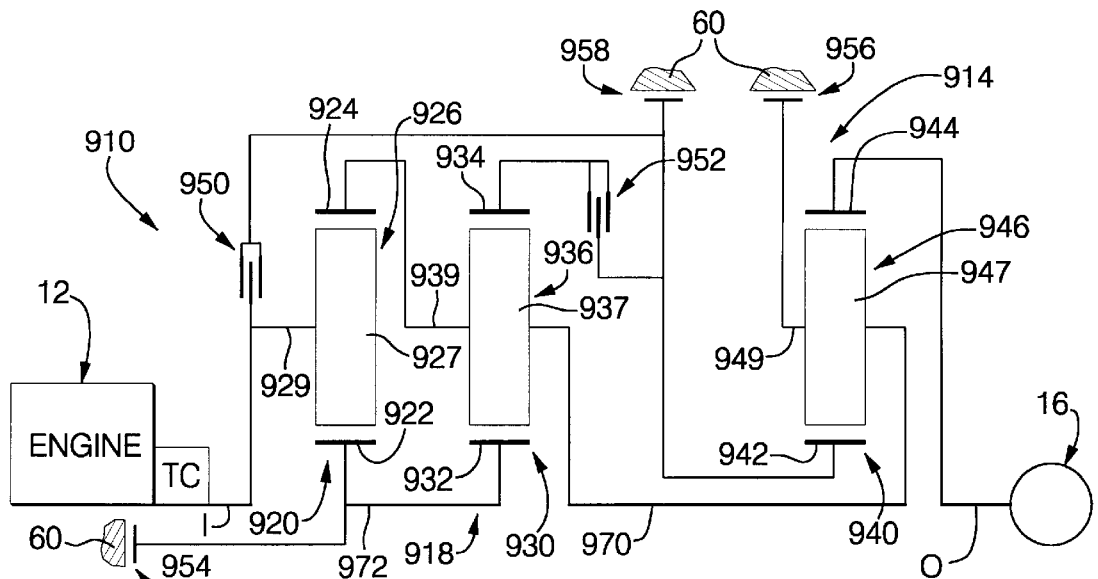
FIG. 19 is a schematic diagram of a powertrain having a transmission incorporating an embodiment of the present invention.
FIG. 20 is a truth table of the shift sequence of the transmission of FIG. 19 and the ratio steps between adjacent drive ratios.

A powertrain 910, shown in FIG. 19, has the conventional engine and torque converter 12, a planetary transmission 914, and the conventional final drive 16. The engine and torque converter 12 are drivingly connected with the transmission 914 through an input shaft I. The transmission is drivingly connected with the final drive 16 through an output shaft O. The planetary transmission 914 includes a planetary gear arrangement 918 that includes a first planetary gear set 920, a second planetary gear set 930 and a third planetary gear set 940. The planetary transmission also includes five torque transmitting mechanism 950, 952, 954, 956, and 958 which are conventional selectively engageable fluid operated devices. The torque transmitting mechanisms 950 and 952 are rotating type mechanisms which are commonly termed clutches. The torque transmitting mechanisms 954, 956 and 958 are stationary type mechanisms which are commonly termed brakes. The torque transmitting mechanisms 954, 956, and 958 are connected to a stationary component of the transmission 914 such as the housing 60.

The planet carrier assembly member 928 is connected with the input shaft I, and the ring gear member 944 is continuously connected with the output shaft O. The ring gear member 924, the planet carrier assembly member 936 and the planet carrier assembly member 946 are continuously interconnected by a first continuous interconnection 970 which is also selectively connectable with the housing 60 through the torque transmitting mechanism 956. The sun gear members 922 and 932 are continuously interconnected by a second continuous interconnection 972 which is selectively connectable with the housing 60 through the torque transmitting mechanism 954. The sun gear member 942 is selectively connectable with the input shaft I and the planet carrier assembly member 926 through the torque transmitting mechanism 950, with the ring gear member 934 through the torque transmitting mechanism 952, and with the housing 60 through the torque transmitting mechanism 958. When the torque transmitting mechanism 958 and the torque transmitting mechanism 952 are simultaneously engaged, both the ring gear member 934 and the sun gear member 944 will be connected with the housing 60. The planetary gear arrangement 918 will provide six forward speed ratios, one reverse speed ratio, and a neutral condition through the selective engagement of the torque transmitting mechanisms in combinations of two.

The truth table shown in FIG. 20 defines the torque transmitting mechanism engagement required for each of the forward speed ratios and the reverse speed ratio. The truth table also indicates that the torque transmitting mechanism 956 can remain engaged during the neutral condition thereby simplifying the first/reverse interchange. The numerical values for the ratios have been determined using the ring/sun tooth ratios given in FIG. 20. The R1/S1 value is the ring/sun tooth ratio of the planetary gear set 920, the R2/S2 value is the ring/sun tooth ratio of the planetary gear set 930, and the R3/S3 value is the ring/sun tooth ratio of the planetary gear set 940. As can be determined from the truth table, the single ratio interchanges for the forward speed ratios are single transition interchanges. Also double step interchanges such as $1^{st}$ to $3^{rd}$, $2^{nd}$ to $4^{th}$, $3^{rd}$ to $5^{th}$, and $4^{th}$ to $6^{th}$ are single interchanges. FIG. 20 also describes the step ratio between adjacent ratios, for example, the numerical step between $1^{st}$ and $2^{nd}$ is 1.71.

Those skilled in the art will recognize that the numerical value of the reverse speed ratio is determined by the planetary gear set 940. The numerical value of the first forward speed ratio is determined by the planetary gear sets 920, 930, and 940. The numerical value of the second forward speed ratio is determined by the planetary gear sets 920, 930 and 940. The third forward speed ratio is a one to one ratio. The numerical value of the fourth forward speed ratio is determined by the planetary gear sets 920, 930, and 940. The numerical value of the fifth forward speed ratio is determined by the planetary gear sets 920 and 940. The numerical value of the sixth forward speed ratio is determined by the planetary gear sets 920 and 940.

Figures 21, 22:
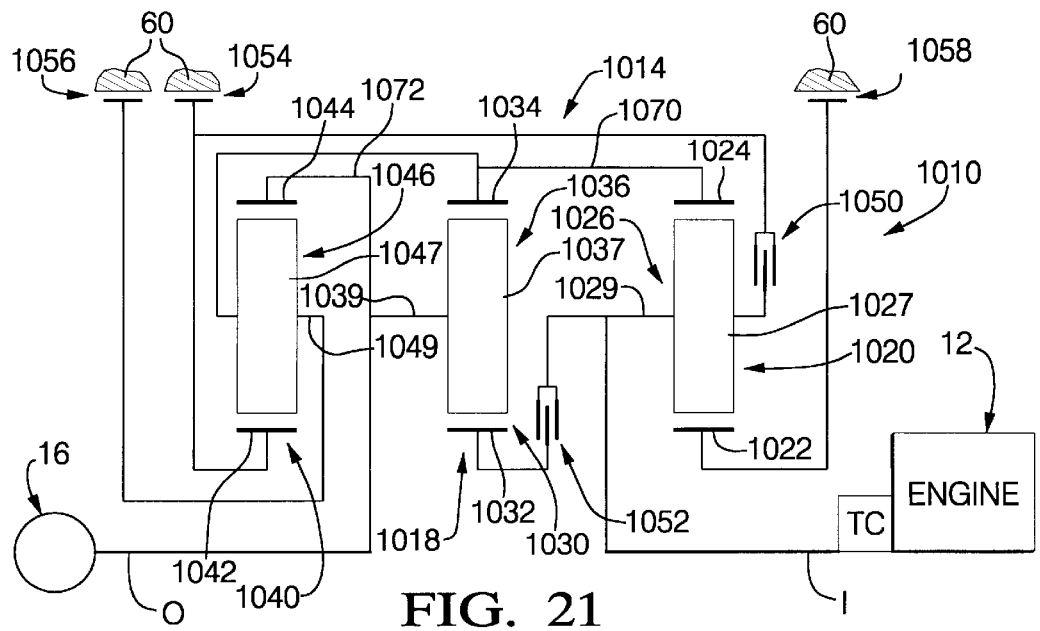
FIG. 21 is a schematic diagram of a powertrain having a transmission incorporating an embodiment of the present invention.
FIG. 22 is a truth table of the shift sequence of the transmission of FIG. 21 and the ratio steps between adjacent drive ratios.

A powertrain 1010, shown in FIG. 21, has the conventional engine and torque converter 12, a planetary transmission 1014, and the conventional final drive 16. The engine and torque converter 12 are drivingly connected with the transmission 1014 through an input shaft I. The transmission is drivingly connected with the final drive 16 through an output shaft O. The planetary transmission 1014 includes a planetary gear arrangement 1018 that includes a first planetary gear set 1020, a second planetary gear set 1030 and a third planetary gear set 1040. The planetary transmission also includes five torque transmitting mechanism 1050, 1052, 1054, 1056, and 1058 which are conventional selectively engageable fluid operated devices. The torque transmitting mechanisms 1050 and 1052 are rotating type mechanisms which are commonly termed clutches. The torque transmitting mechanisms 1054, 1056 and 1058 are stationary type mechanisms which are commonly termed brakes. The torque transmitting mechanisms 1054, 1056, and 1058 are connected to a stationary component of the transmission 1014 such as the housing 60.

The planetary gear set 1020 includes a sun gear member 1022, a ring gear member 1024, and a planet carrier assembly member 1026 that has a plurality of planet pinion gear members 1027 rotatably mounted on a planet carrier 1029. The planetary gear set 1030 includes a sun gear member 1032, a ring gear member 1034, and a planet carrier assembly member 1036 that has a plurality of planet pinion gears 1037 rotatably mounted on a planet carrier 1039. The planetary gear set 1040 has a sun gear member 1042, a ring gear member 1044, and a planet carrier assembly member 1046 that includes a plurality of planet pinion gears 1047 rotatably mounted on a planet carrier 1049.

The planet carrier assembly member 1026 is continuously connected with the input shaft I and is selectively connectable with the sun gear member 1042 through the torque transmitting mechanism 1050. The sun gear member 1042 is also selectively connectable with the housing 60 through the torque transmitting mechanism 1054. The ring gear member 1044 and the planet carrier assembly member 1036 are continuously interconnected by a second continuous interconnection 1072 which is also continuously connected with the output shaft O. The ring gear member 1024, the ring gear member 1034, and the planet carrier assembly member 1046 are continuously interconnected by a first continuous interconnection 1070 which is selectively connectable with the housing 60 through the torque transmitting mechanism 1056. The sun gear member 1032 is selectively connectable with the planet carrier assembly member 1026 and the input shaft I through the torque transmitting mechanism 1052. The sun gear member 1022 is selectively connectable with the housing 60 through the torque transmitting mechanism 1058. The planetary gear arrangement 1018 will provide six forward speed ratios, one reverse speed ratio, and a neutral condition through the selective engagement of the torque transmitting mechanisms in combinations of two.

The truth table shown in FIG. 22 defines the torque transmitting mechanism engagement required for each of the forward speed ratios and the reverse speed ratio. The truth table also indicates that the torque transmitting mechanism 1056 can remain engaged during the neutral condition thereby simplifying the first/reverse interchange. The numerical values for the ratios have been determined using the ring/sun tooth ratios given in FIG. 22. The R1/S1 value is the ring/sun tooth ratio of the planetary gear set 1020, the R2/S2 value is the ring/sun tooth ratio of the planetary gear set 1030, and the R3/S3 value is the ring/sun tooth ratio of the planetary gear set 1040. As can be determined from the truth table, the single ratio interchanges for the forward speed ratios are single transition interchanges. Also double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 22 also describes the step ratio between adjacent ratios for example the numerical step between $1^{st}$ and $2^{nd}$ is 1.86.

Those skilled in the art will recognize that the numerical value of the reverse speed ratio is determined by the planetary gear set 1040. The numerical value of the first forward speed ratio is determined by the planetary gear set 1030. The numerical value of the second forward speed ratio is determined by the planetary gear sets 1030 and 1040. The third forward speed ratio is a one to one ratio. The numerical value of the fourth forward speed ratio is determined by the planetary gear sets 1020 and 1030. The numerical value of the fifth forward speed ratio is determined by the planetary gear sets 1020 and 1040. The numerical value of the sixth forward speed ratio is determined by the planetary gear sets 1020 and 1040.

Figures 23, 24:
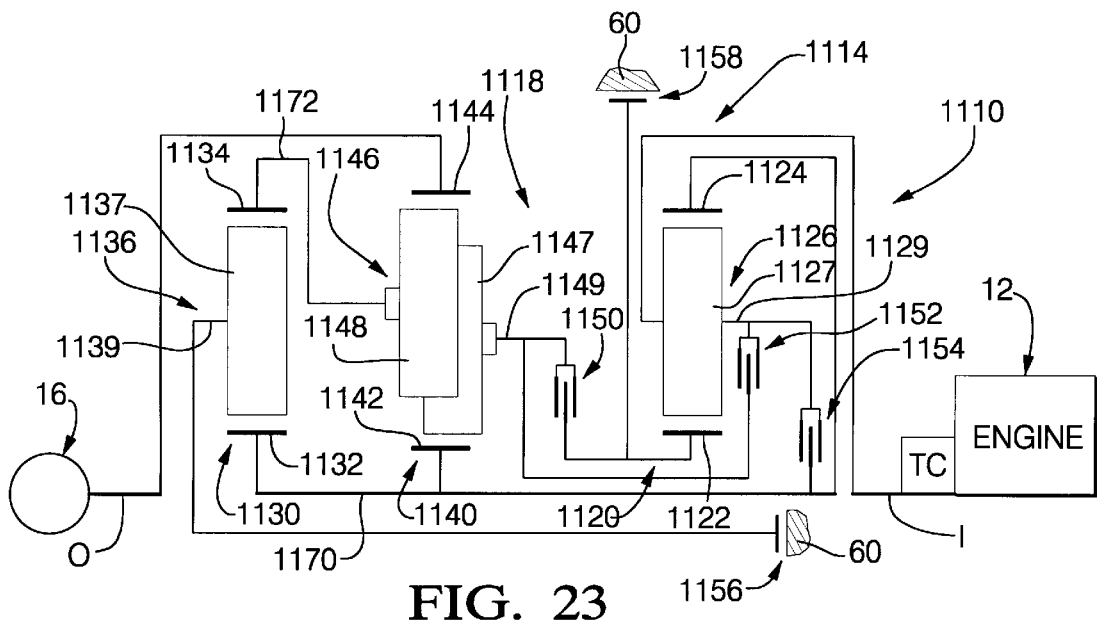
FIG. 23 is a schematic diagram of a powertrain having a transmission incorporating an embodiment of the present invention.
FIG. 24 is a truth table of the shift sequence of the transmission of FIG. 23 and the ratio steps between adjacent drive ratios.

A powertrain 1110, shown in FIG. 23, has the conventional engine and torque converter 12, a planetary transmission 1114, and the conventional final drive 16. The engine and torque converter 12 are drivingly connected with the transmission 1114 through an input shaft I. The transmission is drivingly connected with the final drive 16 through an output shaft O. The planetary transmission 1114 includes a planetary gear arrangement 1118 that includes a first planetary gear set 1120, a second planetary gear set 1130 and a third planetary gear set 1140. The planetary transmission also includes five torque transmitting mechanism 1150, 1152, 1154, 1156, and 1158 which are conventional selectively engageable fluid operated devices. The torque transmitting mechanisms 1150, 1152 and 1154 are rotating type mechanisms which are commonly termed clutches. The torque transmitting mechanisms 1156 and 1158 are stationary type mechanisms which are commonly termed brakes. The torque transmitting mechanisms 1156 and 1158 are connected to a stationary component of the transmission 1114 such as the housing 60.

The planetary gear set 1120 includes a sun gear member 1122, a ring gear member 1124, and a planet carrier assembly member 1126 that has a plurality of planet pinion gear members 1127 rotatably mounted on a planet carrier 1129. The planetary gear set 1130 includes a sun gear member 1132, a ring gear member 1134, and a planet carrier assembly member 1136 that has a plurality of 1137 rotatably mounted on a planet carrier 1139. The planetary gear set 1140 has a sun gear member 1142, a ring gear member 1144, and a planet carrier assembly member 1146 that includes a plurality of meshing planet pinion gears 1147 and 1148 rotatably mounted on a planet carrier 1149. The pinion gears 1147 mesh with the sun gear member 1142 and the pinion gears 1148 mesh with the ring gear member 1144.

The planet carrier assembly member 1126 is continuously connected with the input shaft I and the ring gear member 1144. The ring gear member 1124, the sun gear member 1142, and the sun gear member 1132 are continuously interconnected by a first continuous interconnection 1170 which is also selectively connectable with the planet carrier assembly member 1126 and the input shaft I through the torque transmitting mechanism 1154. The ring gear member 1134 and the planet carrier assembly member 1146 are continuously interconnected by a second continuous interconnection 1172 which is connected with the planet carrier assembly member 1126 and the input shaft I through the torque transmitting mechanism 1152. The sun gear member 1122 is selectively connectable with the housing 60 through the torque transmitting mechanism 1158 and with the planet carrier assembly member 1146 through the torque transmitting mechanism 1150. When the torque transmitting mechanisms 1158 and 1150 are engaged simultaneously, the planet carrier assembly member 1146 is connected with the housing 60. The planet carrier assembly member 1136 is selectively connectable with the housing 60 by the torque transmitting mechanism 1156. The torque transmitting mechanisms 1150, 1152, 1154, 1156, and 1158 are selectively engageable in combinations of two to establish six forward speed ratios and one reverse ratio between the input shaft I and the output shaft O.

The truth table shown in FIG. 24 defines the torque transmitting mechanism engagement required for each of the forward speed ratios and the reverse speed ratio. The truth table also indicates that the torque transmitting mechanism 1156 can remain engaged during the neutral condition thereby simplifying the first/reverse interchange. The numerical values for the ratios have been determined using the ring/sun tooth ratios given in FIG. 24. The R1/S1 value is the ring/sun tooth ratio of the planetary gear set 1120, the R2/S2 value is the ring/sun tooth ratio of the planetary gear set 1130, and the R3/S3 value is the ring/sun tooth ratio of the planetary gear set 1140. As can be determined from the truth table, the single ratio interchanges for the forward speed ratios are single transition interchanges. Also, double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 24 also describes the step ratio between adjacent ratios for example the numerical step between $1^{st}$ and $2^{nd}$ is 1.65.

Those skilled in the art will recognize that the numerical value of the reverse speed ratio is determined by the planetary gear set 1130 and 1140. The numerical value of the first forward speed ratio is determined by the planetary gear sets 1130 and 1140. The numerical value of the second forward speed ratio is determined by the planetary gear sets 1120, 1130, and 1140. The numerical value of the third forward speed ratio is determined by the planetary gear sets 1120, 1130, and 1140. The numerical value of the fourth forward speed ratio is determined by the planetary gear sets 1120 and 1140. The fifth forward speed ratio is a one to one ratio. The numerical value of the sixth forward speed ratio is determined by the planetary gear sets 1120 and 1140.

Figures 25, 26:
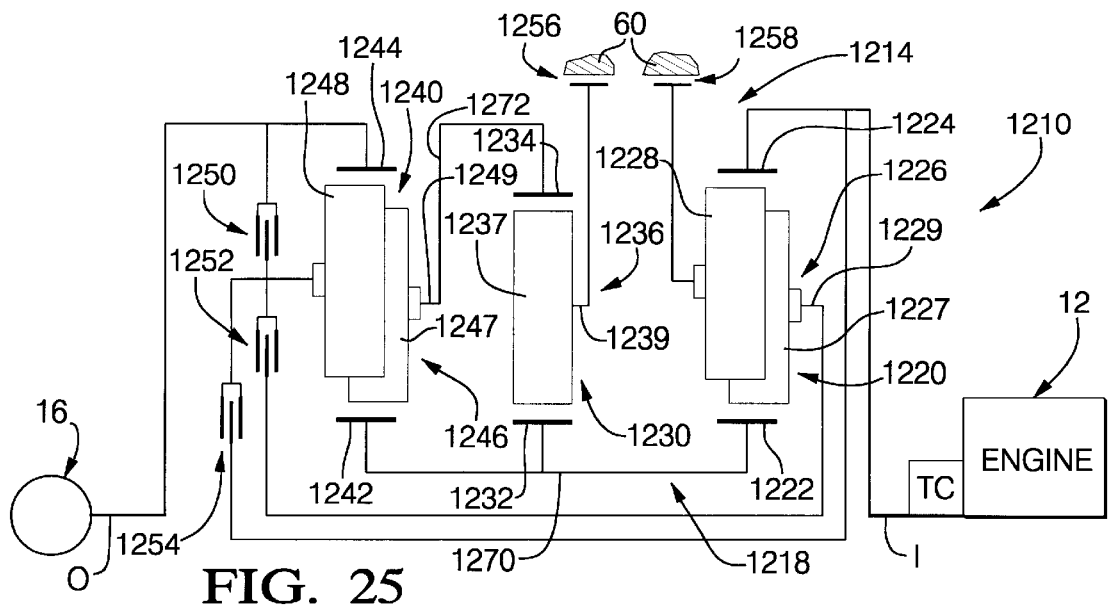
FIG. 25 is a schematic diagram of a powertrain having a transmission incorporating an embodiment of the present invention.
FIG. 26 is a truth table of the shift sequence of the transmission of FIG. 25 and the ratio steps between adjacent drive ratios.

A powertrain 1210, shown in FIG. 25, has the conventional engine and torque converter 12, a planetary transmission 1214, and the conventional final drive 16. The engine and torque converter 12 are drivingly connected with the transmission 1214 through an input shaft I. The transmission is drivingly connected with the final drive 16 through an output shaft O. The planetary transmission 1214 includes a planetary gear arrangement 1218 that includes a first planetary gear set 1220, a second planetary gear set 1230 and a third planetary gear set 1240. The planetary transmission also includes five torque transmitting mechanism 1250, 1252, 1254, 1256, and 1258 which are conventional selectively engageable fluid operated devices. The torque transmitting mechanisms 1250, 1252 and 1254 are rotating type mechanisms which are commonly termed clutches. The torque transmitting mechanisms 1256 and 1258 are stationary type mechanisms which are commonly termed brakes. The torque transmitting mechanisms 1256 and 1258 are connected to a stationary component of the transmission 1214 such as the housing 60.

The planetary gear set 1220 includes a sun gear member 1222, a ring gear member 1224, and a planet carrier assembly member 1226 that has a plurality of intermeshing planet pinion gear members 1227 and 1228 rotatably mounted on a planet carrier 1229. The pinion gears 1227 mesh with the sun gear member 1222 and the pinion gears 1228 mesh with the ring gear member 1224. The planetary gear set 1230 includes a sun gear member 1232, a ring gear member 1234, and a planet carrier assembly member 1236 that has a plurality of 1237 rotatably mounted on a planet carrier 1239. The planetary gear set 1240 has a sun gear member 1242, a ring gear member 1244, and a planet carrier assembly member 1246 that includes a plurality of meshing planet pinion gears 1247 and 1248 rotatably mounted on a planet carrier 1249. The pinion gears 1247 mesh with the sun gear member 1242 and the pinion gears 1248 mesh with the ring gear member 1244.

The ring gear member 1224 is continuously connected with the input shaft I and the ring gear member 1244 is continuously connected with the output shaft O. The sun gear members 1222, 1232 and 1242 are continuously interconnected by a first continuous interconnection 1270. The planet carrier assembly member 1246 and the ring gear member 1234 are continuously interconnected by a second continuous interconnection 1272 which is selectively connectable with the ring gear member 1224 and the input shaft I through the torque transmitting mechanism 1254, with the planet carrier assembly member 1226 through the torque transmitting mechanism 1252, and with the ring gear member 1244 and the output shaft O through the torque transmitting mechanism 1250. The planet carrier assembly member 1236 is selectively connectable with the housing 60 by the torque transmitting mechanism 1256. The planet carrier assembly member 1226 is selectively connectable with the housing 60 through the torque transmitting mechanism 1258. When the torque transmitting mechanisms 1258 and 1252 are engaged simultaneously, the planet carrier assembly member 1246 is selectively connected with the housing 60. The torque transmitting mechanisms 1250, 1252, 1254, 1256, and 1258 are selectively engageable in combinations of two to establish six forward speed ratios and one reverse ratio between the input shaft I and the output shaft O.

The truth table shown in FIG. 26 defines the torque transmitting mechanism engagement required for each of the forward speed ratios and the reverse speed ratio. The truth table also indicates that the torque transmitting mechanism 1256 can remain engaged during the neutral condition, thereby simplifying the first/reverse interchange. The numerical values for the ratios have been determined using the ring/sun tooth ratios given in FIG. 26. The R1/S1 value is the ring/sun tooth ratio of the planetary gear set 1220, the R2/S2 value is the ring/sun tooth ratio of the planetary gear set 1230, and the R3/S3 value is the ring/sun tooth ratio of the planetary gear set 1240. As can be determined from the truth table, the single ratio interchanges for the forward speed ratios are single transition interchanges. Also, some double step interchanges such as $1^{st}$ to $3^{rd}$, $2^{nd}$ to $4^{th}$ and $3^{rd}$ to $5^{th}$ are single transition interchanges. FIG. 26 also describes the step ratio between adjacent ratios for example the numerical step between $1^{st}$ and $2^{nd}$ is 1.53.

Those skilled in the art will recognize that the numerical value of the reverse speed ratio is determined by the planetary gear sets 1230 and 1240. The numerical value of the first forward speed ratio is determined by the planetary gear sets 1220, 1230, and 1240. The numerical value of the second forward speed ratio is determined by the planetary gear sets 1220, 1230, and 1240. The numerical value of the third forward speed ratio is determined by the planetary gear sets 1220 and 1240. The fourth forward speed ratio is a one-to-one ratio. The numerical value of the fifth forward speed ratio is determined by the planetary gear sets 1220 and 1240. The numerical value of the sixth forward speed ratio is determined by the planetary gear set 1220.

Figures 27, 28:
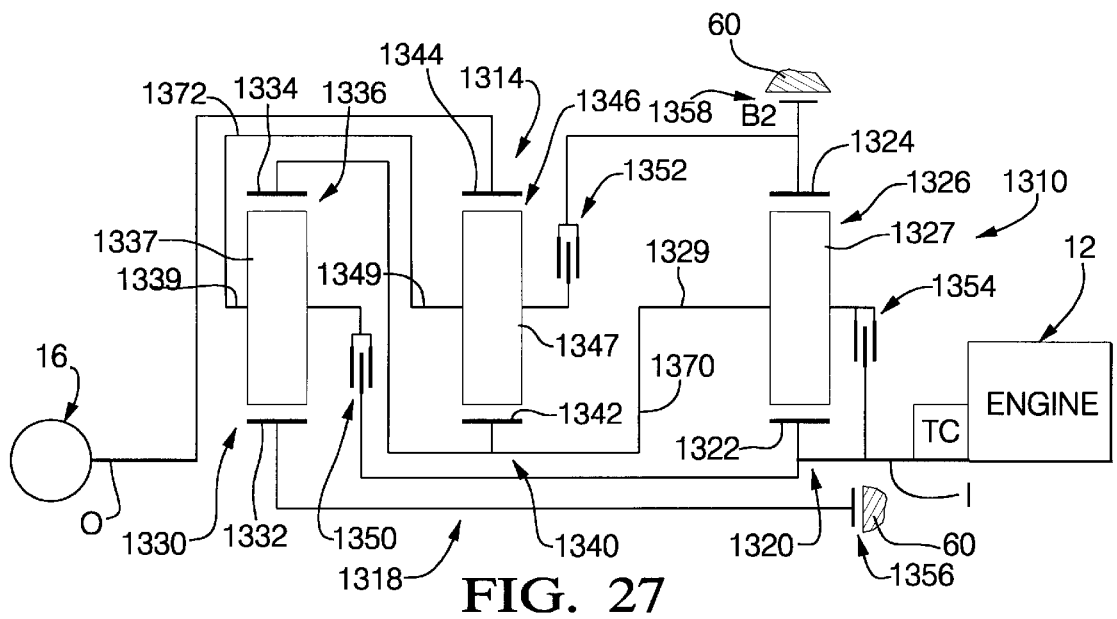
FIG. 27 is a schematic diagram of a powertrain having a transmission incorporating an embodiment of the present invention.
FIG. 28 is a truth table of the shift sequence of the transmission of FIG. 27 and the ratio steps between adjacent drive ratios.

A powertrain 1310, shown in FIG. 27, has the conventional engine and torque converter 12, a planetary transmission 1314, and the conventional final drive 16. The engine and torque converter 12 are drivingly connected with the transmission 1314 through an input shaft I. The transmission is drivingly connected with the final drive 16 through an output shaft O. The planetary transmission 1314 includes a planetary gear arrangement 1318 that includes a first planetary gear set 1320, a second planetary gear set 1330 and a third planetary gear set 1340. The planetary transmission also includes five torque transmitting mechanism 1350, 1352, 1354, 1356, and 1358 which are conventional selectively engageable fluid operated devices. The torque transmitting mechanisms 1350, 1352, and 1354 are rotating-type mechanisms which are commonly termed clutches. The torque transmitting mechanisms 1356 and 1358 are stationary-type mechanisms which are commonly termed brakes. The torque transmitting mechanisms 1356 and 1358 are connected to a stationary component of the transmission 1314 such as the housing 60.

The planetary gear set 1320 includes a sun gear member 1322, a ring gear member 1324, and a planet carrier assembly member 1326 that has a plurality of planet pinion gear members 1327 rotatably mounted on a planet carrier 1329. The planetary gear set 1330 includes a sun gear member 1332, a ring gear member 1334, and a planet carrier assembly member 1336 that has a plurality of planet pinion gears 1337 rotatably mounted on a planet carrier 1339. The planetary gear set 1340 has a sun gear member 1342, a ring gear member 1344, and a planet carrier assembly member 1346 that includes a plurality of planet pinion gears 1347 rotatably mounted on a planet carrier 1349.

The sun gear member 1322 is continuously connected with the input shaft I and the ring gear member 1344 is continuously connected with the output shaft. The planet carrier assembly member 1326, the sun gear member 1342, and the ring gear member 1334 are continuously interconnected by a first continuous interconnection 1370 which is also selectively connectable with the input shaft I through the torque transmitting mechanism 1354. The planet carrier assembly member 1336 and the planet carrier assembly member 1346 are continuously interconnected by a second continuous interconnection 1372 which is also selectively connectable with the ring gear member 1324 through the torque transmitting mechanism 1352. The ring gear member 1324 is selectively connectable with the housing 60 through the torque transmitting mechanism 1358. The second interconnection 1372 is selectively connectable with the input shaft I and the sun gear member 1322 through the torque transmitting mechanism 1350. When the torque transmitting mechanisms 1352 and 1358 are selectively engaged simultaneously, the second connection 1372 is connected with the housing 60. The sun gear member 1332 is selectively connectable with the housing 60 through the torque transmitting mechanism 1356. The planetary gear arrangement 1318 will provide six forward speed ratios, one reverse speed ratio, and a neutral condition through the selective engagement of the torque transmitting mechanisms in combinations of two.

The truth table shown in FIG. 28 defines the torque transmitting mechanism engagement required for each of the forward speed ratios and the reverse speed ratio. The truth table also indicates that the torque transmitting mechanism 1358 can remain engaged during the neutral condition thereby simplifying the first/reverse interchange. The numerical values for the ratios have been determined using the ring/sun tooth ratios given in FIG. 28. The R1/S1 value is the ring/sun tooth ratio of the planetary gear set 1320, the R2/S2 value is the ring/sun tooth ratio of the planetary gear set 1330, and the R3/S3 value is the ring/sun tooth ratio of the planetary gear set 1340. As can be determined from the truth table, the single ratio interchanges for the forward speed ratios are single transition interchanges. Also double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 28 also describes the step ratio between adjacent ratios for example the numerical step between $1^{st}$ and $2^{nd}$ is 1.67.

Those skilled in the art will recognize that the numerical value of the reverse speed ratio is determined by the planetary gear sets 1320 and 1340. The numerical value of the first forward speed ratio is determined by the planetary gear sets 1320, 1330, and 1340. The numerical value of the second forward speed ratio is determined by the planetary gear sets 1320, 1330, and 1340. The numerical value of the third forward speed ratio is determined by the planetary gear sets 1330 and 1340. The numerical value of the fourth forward speed ratio is determined by the planetary gear sets 1330 and 1340. The fifth forward speed ratio is a one to one ratio. The numerical value of the sixth forward speed ratio is determined by the planetary gear sets 1320 and 1340.

Figures 29, 30:
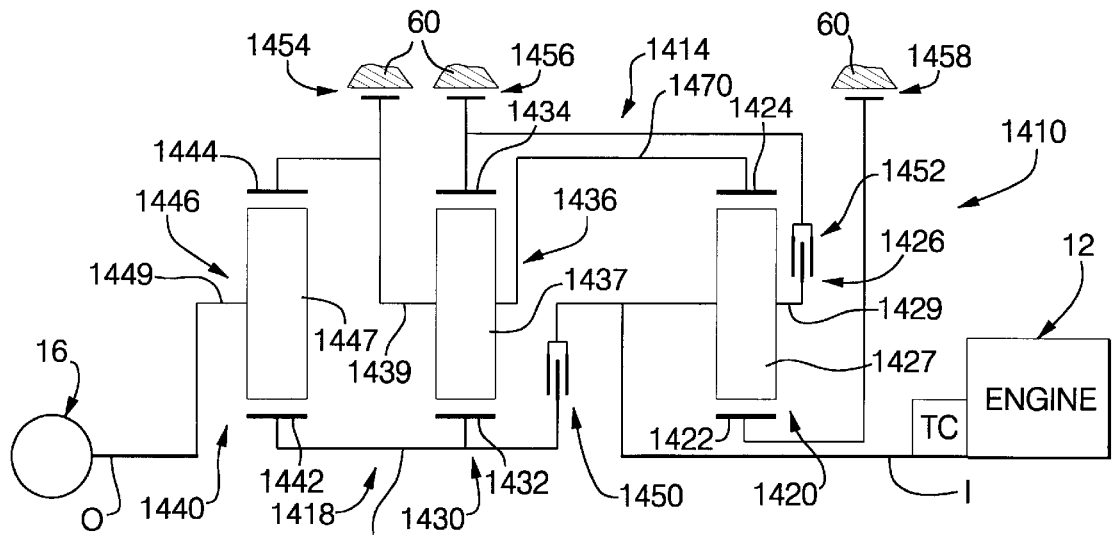
FIG. 29 is a schematic diagram of a powertrain having a transmission incorporating an embodiment of the present invention.
FIG. 30 is a truth table of the shift sequence of the transmission of FIG. 29 and the ratio steps between adjacent drive ratios.

A powertrain 1410, shown in FIG. 29, has the conventional engine and torque converter 12, a planetary transmission 1414, and the conventional final drive 16. The engine and torque converter 12 are drivingly connected with the transmission 1414 through an input shaft I. The transmission is drivingly connected with the final drive 16 through an output shaft O. The planetary transmission 1414 includes a planetary gear arrangement 1418 that includes a first planetary gear set 1420, a second planetary gear set 1430 and a third planetary gear set 1440. The planetary transmission also includes five torque transmitting mechanism 1450, 1452, 1454, 1456, and 1458 which are conventional selectively engageable fluid operated devices. The torque transmitting mechanisms 1450 and 1452 are rotating-type mechanisms which are commonly termed clutches. The torque transmitting mechanisms 1454, 1456 and 1458 are stationary-type mechanisms which are commonly termed brakes. The torque transmitting mechanisms 1454, 1456 and 1458 are connected to a stationary component of the transmission 1414 such as the housing 60.

The planetary gear set 1420 includes a sun gear member 1422, a ring gear member 1424, and a planet carrier assembly member 1426 that has a plurality of planet pinion gear members 1427 rotatably mounted on a planet carrier 1429. The planetary gear set 1430 includes a sun gear member 1432, a ring gear member 1434, and a planet carrier assembly member 1436 that has a plurality of planet pinion gears 1437 rotatably mounted on a planet carrier 1439. The planetary gear set 1440 has a sun gear member 1442, a ring gear member 1444, and a planet carrier assembly member 1446 that includes a plurality of planet pinion gears 1447 rotatably mounted on a planet carrier 1449.

The planet carrier assembly member 1426 is continuously connected with the input shaft I and the planet carrier assembly member 1446 is continuously connected with the output shaft O. The ring gear member 1424, the planet carrier assembly member 1436, and the ring gear member 1444 are continuously interconnected by a first continuous interconnection 1470 which is selectively connectable with the housing 60 through the torque transmitting mechanism 1454. The sun gear members 1432 and 1442 are continuously interconnected by a second continuous interconnection 1472 which is also selectively connectable with the input shaft I and the planet carrier assembly member 1426 through the torque transmitting mechanism 1450. The ring gear member 1434 is selectively connectable with the input shaft I and the planet carrier assembly member 1426 through the torque transmitting mechanism 1452 and selectively connectable with the housing 60 by the torque transmitting mechanism 1456. The sun gear member 1422 is selectively connectable with the housing 60 through the torque transmitting mechanism 1458. The planetary gear arrangement 1418 will provide six forward speed ratios, one reverse speed ratio, and a neutral condition through the selective engagement of the torque transmitting mechanisms in combinations of two.

The truth table shown in FIG. 30 defines the torque transmitting mechanism engagement required for each of the forward speed ratios and the reverse speed ratio. The truth table also indicates that the torque transmitting mechanism 1454 can remain engaged during the neutral condition, thereby simplifying the first/reverse interchange. The numerical values for the ratios have been determined using the ring/sun tooth ratios given in FIG. 30. The R1/S1 value is the ring/sun tooth ratio of the planetary gear set 1420, the R2/S2 value is the ring/sun tooth ratio of the planetary gear set 1430, and the R3/S3 value is the ring/sun tooth ratio of the planetary gear set 1440. As can be determined from the truth table, the single ratio interchanges for the forward speed ratios are single transition interchanges. Also, double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 30 also describes the step ratio between adjacent ratios for example the numerical step between $1^{st}$ and $2^{nd}$ is 1.59.

Those skilled in the art will recognize that the numerical value of the reverse speed ratio is determined by the planetary gear sets 1430 and 1440. The numerical value of the first forward speed ratio is determined by the planetary gear set 1440. The numerical value of the second forward speed ratio is determined by the planetary gear sets 1430 and 1440. The third forward speed ratio is a one to one ratio. The numerical value of the fourth forward speed ratio is determined by the planetary gear sets 1420 and 1440. The numerical value of the fifth forward speed ratio is determined by the planetary gear sets 1420, 1430 and 1440. The numerical value of the sixth forward speed ratio is determined by the planetary gear sets 1420, 1430 and 1440.

Figures 31, 32:
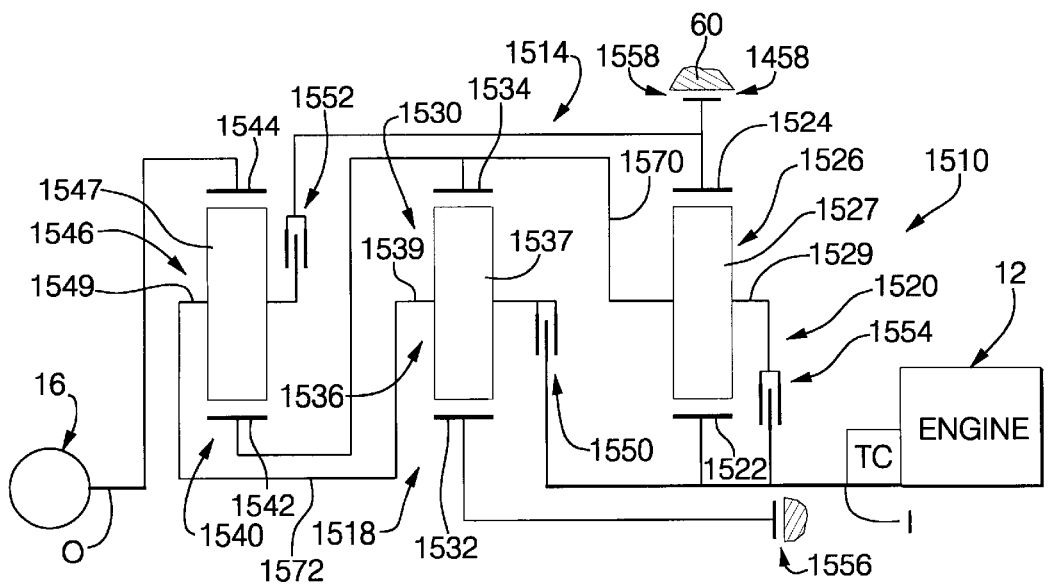
FIG. 31 is a schematic diagram of a powertrain having a transmission incorporating an embodiment of the present invention.
FIG. 32 is a truth table of the shift sequence of the transmission of FIG. 31 and the ratio steps between adjacent drive ratios.

A powertrain 1510, shown in FIG. 31, has the conventional engine and torque converter 12, a planetary transmission 1514, and the conventional final drive 16. The engine and torque converter 12 are drivingly connected with the transmission 1514 through an input shaft I. The transmission is drivingly connected with the final drive 16 through an output shaft O. The planetary transmission 1514 includes a planetary gear arrangement 1518 that includes a first planetary gear set 1520, a second planetary gear set 1530 and a third planetary gear set 1540. The planetary transmission also includes five torque transmitting mechanism 1550, 1552, 1554, 1556 and 1558 which are conventional, selectively engageable, fluid-operated devices. The torque transmitting mechanisms 1550, 1552 and 1554 are rotating-type mechanisms which are commonly termed clutches. The torque transmitting mechanisms 1556 and 1558 are stationary-type mechanisms which are commonly termed brakes. The torque transmitting mechanisms 1556 and 1558 are connected to a stationary component of the transmission 1514 such as the housing 60.

The planetary gear set 1520 includes a sun gear member 1522, a ring gear member 1524, and a planet carrier assembly member 1526 that has a plurality of planet pinion gear members 1527 rotatably mounted on a planet carrier 1529. The planetary gear set 1530 includes a sun gear member 1532, a ring gear member 1534, and a planet carrier assembly member 1536 that has a plurality of planet pinion gears 1537 rotatably mounted on a planet carrier 1539. The planetary gear set 1540 has a sun gear member 1542, a ring gear member 1544, and a planet carrier assembly member 1546 that includes a plurality of planet pinion gears 1547 rotatably mounted on a planet carrier 1549.

The sun gear member 1522 is continuously connected with the input shaft I and the ring gear member 1544 is continuously connected with the output shaft O. The planet carrier assembly member 1526, the ring gear member 1534, and the sun gear member 1542 are continuously interconnected by a first continuous interconnection 1570 which is also selectively connectable with the input shaft I and the sun gear member 1522 through the torque transmitting mechanism 1554. The planet carrier assembly member 1536 and the planet carrier assembly member 1546 are continuously interconnected by a second continuous interconnection 1572 which is also selectively connectable with the input shaft I and the sun gear member 1522 through the torque transmitting mechanism 1550, and with the ring gear member 1524 through the torque transmitting mechanism 1552. The ring gear member 1524 is selectively connectable with the housing 60 through the torque transmitting mechanism 1558. When the torque transmitting mechanisms 1552 and 1558 are selectively engaged simultaneously, the second continuous interconnection will also be connected with the housing to restrict rotation of the planet carrier assembly members 1536 and 1546. The sun gear member 1532 is selectively connectable with the housing 60 through the torque transmitting mechanism 1556. The planetary gear arrangement 1518 will provide six forward speed ratios, one reverse speed ratio, and a neutral condition through the selective engagement of the torque transmitting mechanisms in combinations of two.

The truth table shown in FIG. 32 defines the torque transmitting mechanism engagement required for each of the forward speed ratios and the reverse speed ratio. The truth table also indicates that the torque transmitting mechanism 1558 can remain engaged during the neutral condition, thereby simplifying the first/reverse interchange. The numerical values for the ratios have been determined using the ring/sun tooth ratios given in FIG. 32. The R1/S1 value is the ring/sun tooth ratio of the planetary gear set 1520, the R2/S2 value is the ring/sun tooth ratio of the planetary gear set 1530, and the R3/S3 value is the ring/sun tooth ratio of the planetary gear set 1540. As can be determined from the truth table, the single ratio interchanges for the forward speed ratios are single transition interchanges. Also, double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 32 also describes the step ratio between adjacent ratios for example the numerical step between $1^{st}$ and $2^{nd}$ is 1.75.

Those skilled in the art will recognize that the numerical value of the reverse speed ratio is determined by the planetary gear sets 1520 and 1540. The numerical value of the first forward speed ratio is determined by the planetary gear sets 1520, 1530 and 1540. The numerical value of the second forward speed ratio is determined by the planetary gear sets 1520, 1530 and 1540. The numerical value of the third forward speed ratio is determined by the planetary gear sets 1530 and 1540. The numerical value of the fourth forward speed ratio is determined by the planetary gear sets 1530 and 1540. The fifth forward speed ratio is a one-to-one ratio. The numerical value of the sixth forward speed ratio is determined by the planetary gear sets 1520 and 1540.

Figures 3, 4:
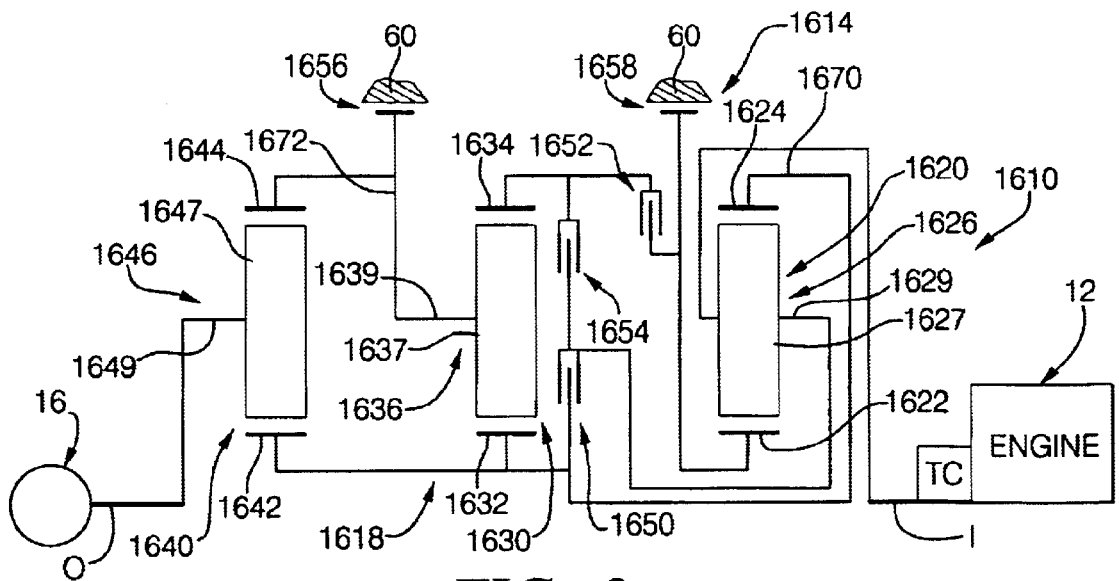
FIG. 3 is a schematic diagram of a powertrain having a transmission incorporating an embodiment of the present invention.
FIG. 4 is a truth table of the shift sequence of the transmission of FIG. 3 and the ratio steps between adjacent drive ratios.

A powertrain 1610, shown in FIG. 3, has the conventional engine and torque converter 12, a planetary transmission 1614, and the conventional final drive 16. The engine and torque converter 12 are drivingly connected with the transmission 1614 through an input shaft I. The transmission is drivingly connected with the final drive 16 through an output shaft O. The planetary transmission 1614 includes a planetary gear arrangement 1618 that includes a first planetary gear set 1620, a second planetary gear set 1630 and a third planetary gear set 1640. The planetary transmission also includes five torque transmitting mechanism 1650, 1652, 1654, 1656 and 1658 which are conventional, selectively engageable, fluid-operated devices. The torque transmitting mechanisms 1650, 1652 and 1654 are rotating-type mechanisms which are commonly termed clutches. The torque transmitting mechanisms 1656 and 1658 are stationary-type mechanisms which are commonly termed brakes. The torque transmitting mechanisms 1656 and 1658 are connected to a stationary component of the transmission 1614 such as the housing 60.

The planetary gear set 1620 includes a sun gear member 1622, a ring gear member 1624, and a planet carrier assembly member 1626 that has a plurality of planet pinion gear members 1627 rotatably mounted on a planet carrier 1629. The planetary gear set 1630 includes a sun gear member 1632, a ring gear member 1634, and a planet carrier assembly member 1636 that has a plurality of planet pinion gears 1637 rotatably mounted on a planet carrier 1639. The planetary gear set 1640 has a sun gear member 1642, a ring gear member 1644, and a planet carrier assembly member 1646 that includes a plurality of planet pinion gears 1647 rotatably mounted on a planet carrier 1649.

The planet carrier assembly member 1626 is continuously connected with the input shaft I and the planet carrier assembly member 1646 is continuously connected with the output shaft O. The ring gear member 1624, the sun gear member 1632, and the sun gear member 1642 are continuously interconnected by a first connection 1670 which is also selectively connectable with the planet carrier assembly member 1626 and the input shaft I through the torque transmitting mechanism 1650. The planet carrier assembly member 1636 and the ring gear member 1644 are continuously interconnected by a second connection 1672 which is selectively connectable with the housing 60 through the torque transmitting mechanism 1656. The ring gear member 1634 is selectively connectable with the planet carrier assembly member 1626 and the input shaft I through the torque transmitting mechanism 1654 and selectively connectable with the sun gear member 1622 through the torque transmitting mechanism 1652. The sun gear member 1622 is selectively connectable with the housing 60 through the torque transmitting mechanism 1658. When the torque transmitting mechanisms 1652 and 1658 are selectively engaged simultaneously, the ring gear member 1634 will be connected with the housing 60 to restrain rotation thereof. The planetary gear arrangement 1618 will provide six forward speed ratios, one reverse speed ratio, and a neutral condition through the selective engagement of the torque transmitting mechanisms in combinations of two.

The truth table shown in FIG. 4 defines the torque transmitting mechanism engagement required for each of the forward speed ratios and the reverse speed ratio. The truth table also indicates that the torque transmitting mechanism 1656 can remain engaged during the neutral condition, thereby simplifying the first/reverse interchange. The numerical values for the ratios have been determined using the ring/sun tooth ratios given in FIG. 4. The R1/S1 value is the ring/sun tooth ratio of the planetary gear set 1620, the R2/S2 value is the ring/sun tooth ratio of the planetary gear set 1630, and the R3/S3 value is the ring/sun tooth ratio of the planetary gear set 1640. As can be determined from the truth table, the single ratio interchanges for the forward speed ratios are single transition interchanges. Also, double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 4 also describes the step ratio between adjacent ratios for example the numerical step between $1^{st}$ and $2^{nd}$ is 1.61.

Those skilled in the art will recognize that the numerical value of the reverse speed ratio is determined by the planetary gear sets 1630 and 1640. The numerical value of the first forward speed ratio is determined by the planetary gear set 1640. The numerical value of the second forward speed ratio is determined by the planetary gear sets 1620 and 1640. The numerical value of the third forward speed ratio is determined by the planetary gear sets 1620, 1630 and 1640. The numerical value of the fourth forward speed ratio is determined by the planetary gear sets 1620, 1630 and 1640. The fifth forward speed ratio is a one-to-one ratio. The numerical value of the sixth forward speed ratio is determined by the planetary gear sets 1620, 1630 and 1640.

What is claimed is:

1. A multi-speed transmission comprising:

an input shaft;

an output shaft;

a stationary member;

a planetary gear arrangement comprising first, second, and third planetary gear sets each having a first member, a second member, and a third member;

said first member of said first planetary gear set being continuously interconnected with said input shaft;

said first member of said third planetary gear set being continuously interconnected with said output shaft;

a first continuous interconnection continuously interconnecting said second members of said first and third planetary gear sets and said first member of said second planetary gear set;

a second continuous interconnection continuously interconnecting said second member of said second planetary gear set with said first member of said first planetary gear set, said third member of said first planetary gear set, said first member of said third planetary gear set, or said third member of said third planetary gear set;

first, second, third, fourth, and fifth selectively engageable torque-transmitting mechanisms with either, said first torque-transmitting mechanism selectively interconnecting said input shaft with said third member of said third planetary gearset, said second torque-transmitting mechanism selectively interconnecting said third member of said second planetary gearset with said third member of said third planetary gear set, said third torque-transmitting mechanism selectively interconnecting said stationary member with said third member of said first planetary gear set, said fourth torque-transmitting mechanism selectively interconnecting said stationary member with said first continuous interconnection and said fifth torque-transmitting mechanism selectively interconnecting said stationary member with said third member of said third planetary gear set, or said first torque-transmitting mechanism selectively interconnecting said input shaft with said second continuous interconnection, said second torque-transmitting mechanism selectively interconnecting said third member of said first planetary gear set with said third member of said second planetary gear set, said third torque-transmitting mechanism selectively interconnecting said stationary member with said second continuous interconnection, said fourth torque-transmitting mechanism selectively interconnecting said stationary member with said first continuous interconnection, and said fifth torque-transmitting mechanism selectively interconnecting said stationary member with said third member of said first planetary gear set, said first torque-transmitting mechanism selectively interconnecting said second continuous interconnection with said third member of said third planetary gear set, said second torque-transmitting mechanism selectively interconnecting said input shaft with said third member of said third planetary gear set, said third torque-transmitting mechanism selectively interconnecting said stationary member with said third member of said second planetary gear set, said fourth torque-transmitting mechanism selectively interconnecting said stationary member with said second continuous interconnection, and said fifth torque-transmitting mechanism selectively interconnecting said stationary member with said third member of said third planetary gear set, or said first torque-transmitting mechanism selectively interconnecting said second continuous interconnection with said third member of said third planetary gear set, said second torque-transmitting mechanism selectively interconnecting said input shaft with said third member of said third planetary gear set, said third torque-transmitting mechanism selectively interconnecting said stationary member with said first continuous interconnection, said fourth torque-transmitting mechanism selectively interconnecting said stationary member with said third member of said second planetary gear set, and said fifth torque-transmitting mechanism selectively interconnecting said stationary member with said third member of said third planetary gear set, or said first torque-transmitting mechanism selectively interconnecting said third member of said second planetary gear set with said third member of said third planetary gear set, said second torque-transmitting mechanism selectively interconnecting said input shaft with said third member of said third planetary gear set, said third torque-transmitting mechanism selectively interconnecting said stationary member with said second continuous interconnection, said fourth torque-transmitting mechanism selectively interconnecting said stationary member with said first continuous interconnection, and said fifth torque-transmitting mechanism selectively interconnecting said stationary member with said third member of said third planetary gear set, or said first torque-transmitting mechanism selectively interconnecting said input shaft with said third member of said third planetary gear set, said second torque-transmitting mechanism selectively interconnecting said output shaft with said third member of said first planetary gear set, said third torque-transmitting mechanism selectively interconnecting said stationary member with said third member of said second planetary gear set, said fourth torque-transmitting mechanism selectively interconnecting said stationary member with said first continuous interconnection, and said fifth torque-transmitting mechanism selectively interconnecting said stationary member with said third member of said third planetary gear set, or said first torque-transmitting mechanism selectively interconnecting said input shaft with said second continuous interconnection, said second torque-transmitting mechanism selectively interconnecting said input shaft with said third member of said second planetary gear set, said third torque-transmitting mechanism selectively interconnecting said stationary member with said second continuous interconnection, said fourth torque-transmitting mechanism selectively interconnecting said stationary member with said first continuous interconnection, and said fifth torque-transmitting mechanism selectively interconnecting said stationary member with said third member of said first planetary gear set, or said first torque-transmitting mechanism selectively interconnecting said input shaft with said third member of said third planetary gear set, said second torque-transmitting mechanism selectively interconnecting said third member of said second planetary gear set with said third member of said third planetary gear set, said third torque-transmitting mechanism selectively interconnecting said stationary member with said first continuous interconnection, said fourth torque-transmitting mechanism selectively interconnecting said stationary member with said third member of said first planetary gear set, and said fifth torque-transmitting mechanism selectively interconnecting said stationary member with said third member of said third planetary gear set, or said first torque-transmitting mechanism selectively interconnecting said input shaft with said third member of said third planetary gear set, said second torque-transmitting mechanism selectively interconnecting said third member of said second planetary gear set with said third member of said second planetary gear set, said third torque-transmitting mechanism selectively interconnecting said stationary member with said second continuous interconnection, said fourth torque-transmitting mechanism selectively interconnecting said stationary member with said first continuous interconnection, and said fifth torque-transmitting mechanism selectively interconnecting said stationary member with said third member of said third planetary gear set, or first torque-transmitting mechanism selectively interconnecting said input shaft with said third member of said third planetary gear set, said second torque-transmitting mechanism selectively interconnecting said input shaft with said third member of said second planetary gear set, said third torque-transmitting mechanism selectively interconnecting said stationary member with said third member of said third planetary gear set, said fourth torque-transmitting mechanism selectively interconnecting said stationary member with said first continuous interconnection, and said fifth torque-transmitting mechanism selectively interconnecting said stationary member with said third member of said first planetary gear set, or said first torque-transmitting mechanism selectively interconnecting said third member of said first planetary gear set with said second continuous interconnection, said second torque-transmitting mechanism selectively interconnecting said input shaft with said second continuous interconnection, said third torque-transmitting mechanism selectively interconnecting said input shaft with said second continuous interconnection, said fourth torque-transmitting mechanism selectively interconnecting said stationary member with said third member of said second planetary gear set, and said fifth torque-transmitting mechanism selectively interconnecting said stationary member with said third member of said first planetary gear set, or said first torque-transmitting mechanism selectively interconnecting said output shaft with said third member of said third planetary gear set, said second torque-transmitting mechanism selectively interconnecting said third member of said first planetary gear set with said third member of said third planetary gear set, said third torque-transmitting mechanism selectively interconnecting said input shaft with said third member of said third planetary gear set, said fourth torque-transmitting mechanism selectively interconnecting said stationary member with said third member of said second planetary gear set, and said fifth torque-transmitting mechanism selectively interconnecting said stationary member with said third member of said first planetary gear set, or first torque-transmitting mechanism selectively interconnecting said input shaft with said second continuous interconnection, said second torque-transmitting mechanism selectively interconnecting said third member of said first planetary gear set with said second continuous interconnection, said third torque-transmitting mechanism selectively interconnecting said input shaft with said first continuous interconnection, said fourth torque-transmitting mechanism selectively interconnecting said stationary member with said third member of said second planetary gear set, and said fifth torque-transmitting mechanism selectively interconnecting said stationary member with said third member of said first planetary gear set, or said first torque-transmitting mechanism selectively interconnecting said input shaft with said second continuous interconnection, said second torque-transmitting mechanism selectively interconnecting said input shaft with said third member of said second planetary gear set, said third torque-transmitting mechanism selectively interconnecting said stationary member with said first continuous interconnection, said fourth torque-transmitting mechanism selectively interconnecting said stationary member with said third member of said second planetary gear set, and said fifth torque-transmitting mechanism selectively interconnecting said stationary member with said third member of said first planetary gear set, or said first torque-transmitting mechanism selectively interconnecting said input shaft with said second continuous interconnection, said second torque-transmitting mechanism selectively interconnecting said third member of said first planetary gear set with said second continuous interconnection, said third torque-transmitting mechanism selectively interconnecting said input shaft with said first continuous interconnection, said fourth torque-transmitting mechanism selectively interconnecting said stationary member with said third member of said second planetary gear set, and said fifth torque-transmitting mechanism selectively interconnecting said stationary member with said third member of said first planetary gear set, or said first torque-transmitting mechanism selectively interconnecting said input shaft with said first continuous interconnection, said second torque-transmitting mechanism selectively interconnecting said third member of said first planetary gear set with said third member of said second planetary gear set, said third torque-transmitting mechanism selectively interconnecting said input shaft with said third member of said second planetary gear set, said fourth torque-transmitting mechanism selectively interconnecting said stationary member with said second continuous interconnection, and said fifth torque-transmitting mechanism selectively interconnecting said stationary member with said third member of said first planetary gear set; and said selectively engageable torque transmitting mechanisms being selectively engaged in combinations of two to establish six forward ratios and one reverse ratio between said input shaft and said output shaft.

2. The transmission defined in claim 1 further wherein:
at least of the said planetary gear sets is of the single pinion type.

3. The transmission defined in claim 1 further wherein:
at least one of the said planetary gear sets is of the double pinion type.

* * * * *